(12) United States Patent
Yonaha

(10) Patent No.: US 10,664,887 B2
(45) Date of Patent: May 26, 2020

(54) SYSTEM AND METHOD FOR ASSOCIATING SENSIBILITY WORDS WITH PHYSICAL PRODUCT CHARACTERISTICS BASED ON USER ATTRIBUTES AND DISPLAYING PRODUCT IMAGES ON A COORDINATE SYSTEM

(71) Applicant: FUJIFILM Corporation, Tokyo (JP)

(72) Inventor: Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 754 days.

(21) Appl. No.: 15/205,380

(22) Filed: Jul. 8, 2016

(65) Prior Publication Data

US 2016/0321730 A1 Nov. 3, 2016

Related U.S. Application Data

(63) Continuation of application No. PCT/JP2015/051244, filed on Jan. 19, 2015.

(30) Foreign Application Priority Data

Feb. 28, 2014 (JP) .................................. 2014-038524

(51) Int. Cl.
*G06F 16/9535* (2019.01)
*G06Q 30/06* (2012.01)
(Continued)

(52) U.S. Cl.
CPC ......... *G06Q 30/0627* (2013.01); *G06F 16/54* (2019.01); *G06F 16/58* (2019.01); *G06F 16/951* (2019.01); *G06F 16/9535* (2019.01)

(58) Field of Classification Search
None
See application file for complete search history.

(56) References Cited

U.S. PATENT DOCUMENTS 7,660,822 B1 * 2/2010 Pfleger ............... G06F 17/30554
707/693
8,538,943 B1 9/2013 Bau et al.
(Continued)

FOREIGN PATENT DOCUMENTS

JP 11-120180 A 4/1999
JP 2002-157268 A 5/2002
(Continued)

OTHER PUBLICATIONS

Cheng, Ching-I., and Damon Shing-Min Liu. "An intelligent clothes search system based on fashion styles." 2008 Internaitonal Conference on Machine Learning and Cybernetics. vol. 3, IEEE, 2008 (Year: 2008).*

(Continued)

*Primary Examiner* — Michelle T Kringen
(74) *Attorney, Agent, or Firm* — Studebaker & Brackett PC

(57) ABSTRACT

A search system specifies an image of a product according to a preference of a user conveniently and accurately using a sensibility word and displays the product image so that information of the product image is intuitively understood by the user. In a client terminal, sensibility word data is specified by a user and sent to a server system. In the server system, the sensibility word data is received, a physical amount of a product associated with the sensibility word data is acquired, image data of the product associated with the physical amount of the product is acquired, and display information data indicating a display aspect for the image is generated. The image data of the product and the display information data are transmitted from the server system to the client terminal, and the image data of the product is displayed based on the display information data in the client terminal.

18 Claims, 15 Drawing Sheets

(51) Int. Cl.
*G06F 16/58* (2019.01)
*G06F 16/951* (2019.01)
*G06F 16/54* (2019.01)

(56) References Cited

U.S. PATENT DOCUMENTS

| | | | |
|---|---|---|---|
| 8,566,712 | B1 | 10/2013 | Varian |
| 2002/0062299 | A1 | 5/2002 | Matsukura et al. |
| 2003/0167264 | A1 | 9/2003 | Ogura et al. |
| 2006/0064411 | A1* | 3/2006 | Gross .............. G06F 17/30864 |
| 2009/0112910 | A1 | 4/2009 | Picault et al. |
| 2010/0076867 | A1* | 3/2010 | Inoue .............. G06F 17/30256 |
| | | | 705/26.1 |
| 2010/0149132 | A1 | 6/2010 | Iwase et al. |
| 2011/0270697 | A1 | 11/2011 | Sankada |
| 2011/0314052 | A1 | 12/2011 | Francis et al. |
| 2013/0080426 | A1* | 3/2013 | Chen .............. G06F 17/30247 |
| | | | 707/723 |
| 2014/0249955 | A1 | 9/2014 | Yokomichi |

FOREIGN PATENT DOCUMENTS

| | | |
|---|---|---|
| JP | 2010-140391 A | 6/2010 |
| JP | 2011-065499 A | 3/2011 |
| JP | 2012-108721 A | 6/2012 |
| JP | 2013-077108 A | 4/2013 |

OTHER PUBLICATIONS

Communication pursuant to Article 94(3) EPC issued by the European Patent Office dated May 11, 2018, which corresponds to European Patent Application No. 15 754 895.9-1217 and is related to U.S. Appl. No. 5/205,380.
International Search Report issued in PCT/JP2015/051244; dated Mar. 3, 2015.
Written Opinion issued in PCT/JP2015/051244; dated Mar. 3, 2015.
The extended European search report issued by the European Patent Office dated Jan. 18, 2017, which corresponds to European Patent Application No. 15754895.9-1871 and is related to U.S. Appl. No. 15/205,380.
An Office Action mailed by the State Intellectual Property Office of the People's Republic of China dated Jan. 4, 2019, which corresponds to Chinese Patent Application No. 201580010270.3 and is related to U.S. Appl. No. 15/205,380; with English translation.
An Office Action mailed by the State Intellectual Property Office of People's Republic of China dated Apr. 3, 2019, which corresponds to Chinese Patent Application No. 201580010270.3 and is related to U.S. Appl. No. 15/205,380.

* cited by examiner

SYSTEM AND METHOD FOR ASSOCIATING SENSIBILITY WORDS WITH PHYSICAL PRODUCT CHARACTERISTICS BASED ON USER ATTRIBUTES AND DISPLAYING PRODUCT IMAGES ON A COORDINATE SYSTEM

CROSS-REFERENCE TO RELATED APPLICATIONS

The present application is a Continuation of PCT International Application No. PCT/JP2015/051244 filed on Jan. 19, 2015 claiming priority under 35 U.S.C § 119(a) to Japanese Patent Application No. 2014-038524 filed on Feb. 28, 2014. Each of the above applications is hereby expressly incorporated by reference, in their entirety, into the present application.

BACKGROUND OF THE INVENTION

1. Field of the Invention

The present invention relates to a search system, a server system, and a method of controlling a search system and a server system, and more particularly, to a search technology using sensibility words.

2. Description of the Related Art

In a case in which a product such as a suit is searched for on an electronic commerce (EC) site on the Internet, products can be narrowed down by designating a price, a size, or a color, and the like. For example, if a user designates a color of a desired suit on a web page, a list of suit images related to the designated color is displayed. The user can select a desired suit image from the displayed list of suit images to buy a suit of the selected image.

However, the colors that can be selected by users on an EC site may be limited, and the users may not be able to designate an exact desired color. Further, since a user often chooses a product based on a vague impression at the time of purchase in a real store or the like, it is not necessarily preferable to perform product searching based on a specific color from the viewpoint of encouraging purchase of a product.

In searching for product images based on the color or the like, a product matching a color or an impression actually desired by a user may not necessarily be presented in search results. Therefore, various search technologies based on information other than the color have been proposed.

JP2002-157268A discloses a product information notification system that enables effective presentation to be performed by changing additional information of products for each user. In this product information notification system, basic information of a product group to which the user tries to refer is selected from a product information database in which basic information (for example, a product name, a size, a color, and a manufacturer name) of each product is stored, and the selected basic information is provided to the user. Further, corresponding additional information is selected from the additional information database based on profile information of a user, and the selected additional information is provided to the user.

JP2011-065499A discloses an image search apparatus that performs searching using keywords including sensibility words. In this image search apparatus, acquired keywords are divided into nouns and sensibility words, a feature amount to be used for searching is acquired from a sensibility word and a noun-feature amount database based on a combination of the noun and the sensibility word, and an image is searched for using the acquired feature amount.

SUMMARY OF THE INVENTION

As means for enabling a user (a customer) to simply search for a desired product, a scheme of using a sensibility word as a search word is effective. However, an impression represented by the sensibility word is different among users and also easily changes according to a period in time. That is, associated products may be different among users even when sensibility words are the same, and a preference of a specific user changes over time and products associated from the same sensibility word may be different.

Therefore, it is preferable for overall convenience of product searching on an EC site to be improved by realizing high-accuracy product searching using an intuitive search technology using a sensibility word as a keyword and appropriately presenting images of a plurality of candidate products that are searched for to a user, and ultimately, for an increase in sales of products to be achieved.

Therefore, a new technology for enabling a user visiting an EC site to simply find a desired product and to perform purchase decision more reliably is desired. More specifically, a proposal of a new search system that enables a user to immediately perform purchase decision from results of a search using a sensibility word with respect to a series of search actions from an "input of a search keyword of a sensibility word by the user" to "display of the search results" is desired.

However, in product search technology using a sensibility word, a technology regarding such a series of search actions has not been proposed in the related art.

For example, the product information notification system in JP2002-157268A aims at performing effective presentation by changing additional information of a product for each user. However, a search using a sensibility word is not performed in this product information notification system. Further, in this product information notification system, a display of search results or the like for enabling a user to conveniently find a desired product is not provided.

Further, although the image search apparatus in JP2011-065499A adopts a search technology using sensibility words, a display of search results or the like for enabling a user to conveniently find a desired product is not provided, similar to the product information notification system in JP2002-157268A.

The present invention has been made in view of the above circumstances, and an object thereof is to provide a technology for specifying images of a plurality of products according to a preference of a user conveniently and accurately using sensibility words and displaying the product images so that a relationship among the plurality of product images can intuitively be understood by the user.

An aspect of the present invention includes a search system comprising a client terminal and a server system connected to the client terminal over a network, in which the server system includes: a server reception unit that receives data transmitted from the client terminal over the network; a physical amount acquisition unit that acquires a physical amount of a product associated with sensibility word data received by the server reception unit from the client terminal over the network; an image search unit that acquires image data of the product associated with the physical amount of the product acquired by the physical amount acquisition unit; an image alignment unit that determines a display aspect of the image data of the product acquired by the image search unit, and generates display information data indicating the determined display aspect; and a server transmission unit that transmits the image data of the product acquired by the image search unit and the display information data generated by the image alignment unit to the client terminal over the network, and the client terminal includes: a display unit; a terminal input unit for allowing a user to specify the sensibility word data; a terminal transmission unit that transmits the sensibility word data specified through the terminal input unit to the server system over the network; a terminal reception unit that receives the image data of the product and the display information data transmitted from the server system over the network; and a display control unit that displays the image data of the product received by the terminal reception unit on the display unit according to the display information data received by the terminal reception unit.

According to this aspect, the image data of the product is acquired based on the physical amount of the product associated with the sensibility word data specified by the user, and thus, the image of the product according to a preference of the user can be specified conveniently and accurately using the sensibility word. Further, since the image data of the product is displayed according to the display information data, the product image can be displayed so that information of the product image acquired through the search is intuitively understood by the user.

Preferably, the server system further includes a user information database that stores user identification data and user attributes data in association with each other; a user attributes information acquisition unit that accesses the user information database and acquires the user attributes data associated with the user identification data received from the client terminal over the network; a conversion table database that stores a plurality of conversion tables determined according to the user attributes data, a physical amount of the product and the sensibility word data being associated with each other in the plurality of conversion tables; a conversion table acquisition unit that accesses the conversion table database and acquires the conversion table associated with the user attributes data acquired by the user attributes information acquisition unit; and an image database that stores the image data of the product and the physical amount of the product in association with each other, the user identification data and the sensibility word data are specified by the user through the terminal input unit, the terminal transmission unit transmits the user identification data and the sensibility word data specified via the terminal input unit to the server system over the network, the physical amount acquisition unit acquires the physical amount of the product associated with the sensibility word data received by the server reception unit by referring to the conversion table acquired by the conversion table acquisition unit, and the image search unit accesses the image database to acquire the image data of the product associated with the physical amount of the product acquired by the physical amount acquisition unit.

According to this aspect, since the conversion table acquired according to the user attributes data is referred to and the physical amount of the product is acquired, the acquisition of the image data of the product is performed according to the attributes of the user.

Preferably, the image alignment unit determines that a display aspect of the image data of the product acquired by the image search unit is an aspect in which the image data of the product is displayed according to characteristics data of the product, and the display information data indicates a display aspect in which the image data of the product acquired by the image search unit is displayed according to characteristics data of the product.

According to this aspect, since the image data of the product acquired by the image search unit is displayed according to the characteristics data of the product, the user can intuitively understand a relationship between product images according to the product characteristics.

Preferably, the display information data indicates a display aspect in which at least a portion of the image data of the product acquired by the image search unit is displayed on a coordinate system representing characteristics data of the product.

According to this aspect, since at least a portion of the image data of the product is displayed on a coordinate system representing characteristics data of a product, the user can intuitively understand a relationship between the product images in the coordinate system.

Preferably, the characteristics data of the product is determined based on characteristics different from the sensibility word data that a user specifies through the terminal input unit among the characteristics of the product.

According to this aspect, the image data of the product is displayed based on the characteristics different from the sensibility word data specified by the user. The "characteristics different from the sensibility word data that a user specifies through the terminal input unit" may be product characteristics that are based on the sensibility word or may be product characteristics that are not based on the sensibility word.

Preferably, the characteristics data of the product is determined based on data of at least one of a price of the product and a size of the product.

In this case, the user can intuitively understand the product of which the image is displayed, regarding at least one of the price of the product and the size of the product.

Preferably, the physical amount of the product is determined based on at least one of a color of the product, a pattern of the product, a texture of the product, or a shape of the product.

According to this aspect, it is possible to acquire the image data of the product based on at least one of a color of the product, a pattern of the product, a texture of the product, or a shape of the product.

Preferably, the user attributes data is determined based on at least one of the gender, age, race, nationality, religion, or sect of the user.

According to this aspect, it is possible to acquire the "physical amount of the product associated with the sensibility word data" by referring to the conversion table based on at least one of the gender, age, race, nationality, religion, or sect of the user.

Preferably, the display control unit displays a plurality of sensibility words on the display unit, and the terminal input unit receives an instruction from the user, specifies at least one of the plurality of sensibility words displayed on the display unit, and specifies the specified sensibility word as the sensibility word data.

According to this aspect, since the user can determine the sensibility word data by specifying at least one of the plurality of sensibility words displayed on the display unit, very high convenience is achieved.

Preferably, the image data of the product is acquired by imaging the product.

According to this aspect, appropriate image data of a real product acquired by imaging the real product is used.

Preferably, metadata indicating a physical amount of the product is added to the image data of the product, and the image search unit acquires the image data of the product to which the metadata indicating a physical amount of the product acquired by the physical amount acquisition unit is added, as image data of the product associated with the physical amount of the product acquired by the physical amount acquisition unit.

According to this aspect, it is possible to conveniently acquire the image data of the product associated with the physical amount of the product based on the metadata.

Preferably, the physical amount of the product associated with the image data of the product is acquired by analyzing the image data of the product.

According to this aspect, the physical amount of the product is acquired through image analysis.

Preferably, the server system further includes an image analysis unit that analyzes the image data of the product to acquire a physical amount of the product, the image analysis unit storing the acquired physical amount of the product in association with the image data of the product in the image database.

According to this aspect, the physical amount of the product is acquired through the analysis of the image data in the image analysis unit.

Another aspect of the present invention relates to a server system connected to a client terminal over a network, the server system comprising: a server reception unit that receives data transmitted from the client terminal over the network; a physical amount acquisition unit that acquires a physical amount of a product associated with sensibility word data received by the server reception unit from the client terminal over the network; an image search unit that acquires image data of the product associated with the physical amount of the product acquired by the physical amount acquisition unit; an image alignment unit that determines a display aspect of the image data of the product acquired by the image search unit, and generates display information data indicating the determined display aspect; and a server transmission unit that transmits the image data of the product acquired by the image search unit and the display information data generated by the image alignment unit to the client terminal over the network.

Still another aspect of the present invention relates to a control method for a search system comprising a client terminal, and a server system connected to the client terminal over a network, the control method comprising: receiving, by a server reception unit in the server system, data transmitted from the client terminal over the network; acquiring, by a physical amount acquisition unit in the server system, a physical amount of a product associated with sensibility word data received by the server reception unit from the client terminal over the network; acquiring, by an image search unit in the server system, image data of the product associated with the physical amount of the product acquired by the physical amount acquisition unit; determining, by an image alignment unit in the server system, a display aspect of the image data of the product acquired by the image search unit, and generating display information data indicating the determined display aspect; transmitting, by a server transmission unit in the server system, the image data of the product acquired by the image search unit and the display information data generated by the image alignment unit to the client terminal over the network; transmitting, by a terminal transmission unit in the client terminal, the sensibility word data specified by a user through a terminal input unit to the server system over the network; receiving, by a terminal reception unit in the client terminal, the image data of the product and the display information data transmitted from the server system over the network; and displaying, by a display control unit in the client terminal, the image data of the product received by the terminal reception unit on the display unit according to the display information data received by the terminal reception unit.

Still another aspect of the present invention relates to a control method for a server system connected to a client terminal over a network, the control method comprising: receiving, by a server reception unit, data transmitted from the client terminal over the network; acquiring, by a physical amount acquisition unit, a physical amount of a product associated with sensibility word data received by the server reception unit from the client terminal over the network; acquiring, by an image search unit, image data of the product associated with the physical amount of the product acquired by the physical amount acquisition unit; determining, by an image alignment unit, a display aspect of the image data of the product acquired by the image search unit and generating display information data indicating the determined display aspect; and transmitting, by a server transmission unit, the image data of the product acquired by the image search unit and the display information data generated by the image alignment unit to the client terminal over the network.

According to the present invention, the image data of the product is acquired based on the physical amount of the product associated with the sensibility word data specified by the user, and the image data of the product is displayed according to the display information data indicating the display aspect of the image data of the product. Accordingly, the image of the product according to a preference of the user can be specified conveniently and accurately using the sensibility word, and the user can intuitively understand information of the product.

DESCRIPTION OF THE PREFERRED EMBODIMENTS

An embodiment of the present invention will be described with reference to drawings. An example in which a "suit" is a search target as a product will be described in the following embodiment, but the present invention is not limited thereto and the present invention can be applied to a case in which any other product is searched for.

Figure 1:
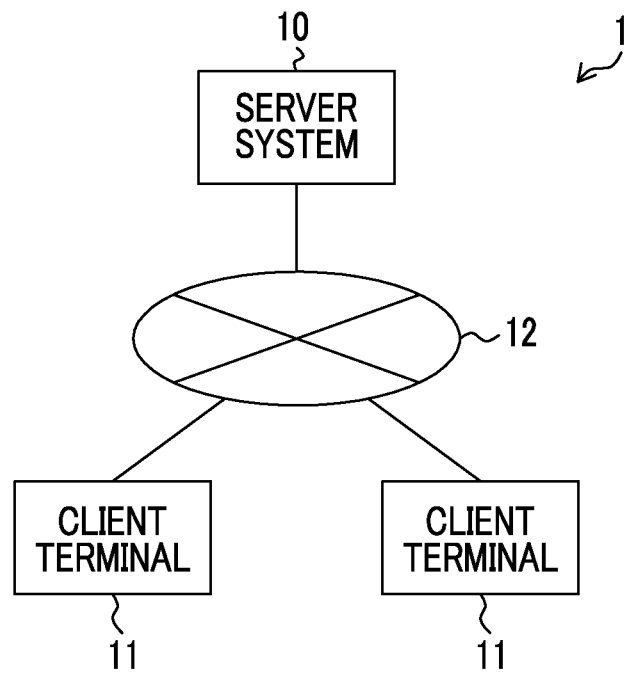
FIG. 1 is a conceptual diagram of a search system.

FIG. 1 is a conceptual diagram of a search system 1. The search system 1 according to this embodiment includes client terminals 11, and a server system 10 connected to each of the client terminals 11 over a network 12 such as the Internet.

The client terminal 11 is a terminal that a user operates when searching for a product such as a suit and is, for example, has a form such as a portable terminal such as a smartphone or a tablet device, or a personal computer.

The server system 10 performs product search in response to a command transmitted from the client terminal 11 over the network 12, and returns a search result to the client terminal 11 over the network 12.

A functional configuration of the client terminal 11 in the search system 1 will first be described.

Figure 2:
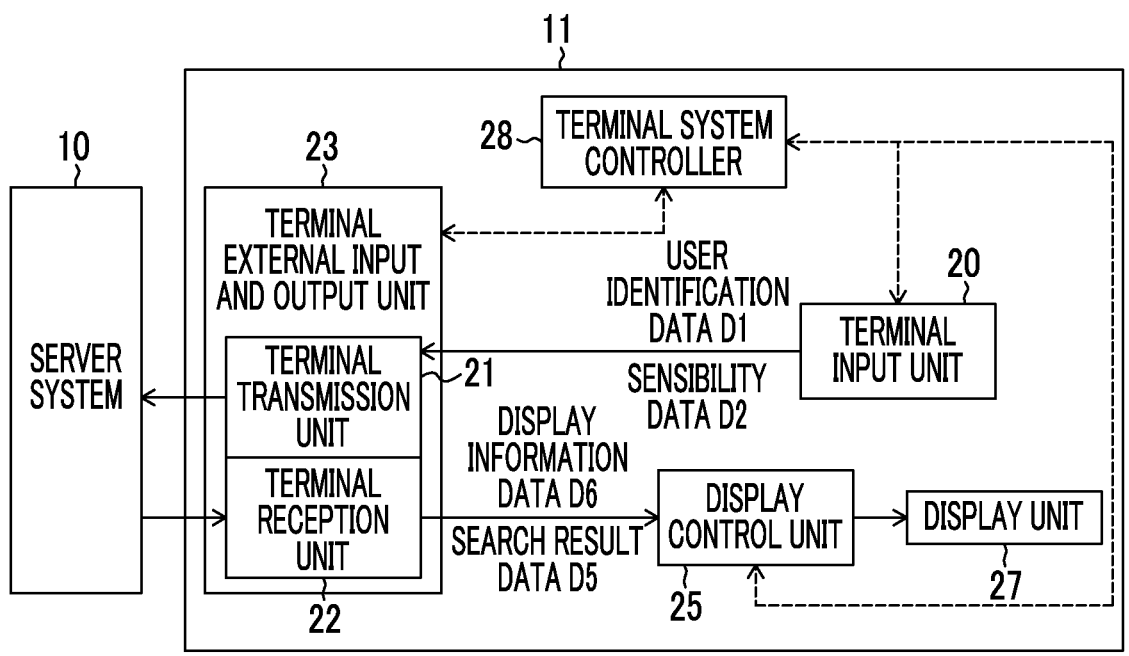
FIG. 2 is a block diagram illustrating an example of a functional configuration of a client terminal.

FIG. 2 is a block diagram illustrating an example of a functional configuration of the client terminal 11.

The client terminal 11 of the present example includes a terminal input unit 20, a terminal external input and output unit 23 (a terminal transmission unit 21 and a terminal reception unit 22), a display control unit 25, a display unit 27, and a terminal system controller 28.

The terminal input unit 20 includes an operation unit that is directly operated by the user so as to input data such as a user ID, a password, or a search word (search basic information), and an information specifying unit that specifies the data such as a user ID, a password, or search basic information input via the operation unit.

The user ID and the password are data for specifying the user who operates the client terminal 11. One or a combination of both of the user ID and the password is hereinafter also referred to as "user identification data D1". The "search word (search basic information)" is a term indicating a feature of a product desired by the user, and in this embodiment, sensibility word data D2 is used as the search word. The sensibility word data D2 is data indicating a sensitive term (sensibility word), and the sensibility word data D2 as the search word represents an impression that the user expects from a search product.

For example, in a case in which the client terminal 11 is a portable terminal such as a smartphone, buttons or a touch panel provided in the client terminal 11 can be used as the operation unit, and an information specifying unit specifies sensibility word data selected by the operation unit. The user may input data using any scheme through the operation unit or may directly input data by selecting one or more desired data items from among a plurality of candidates displayed on the display unit 27.

Figure 3:
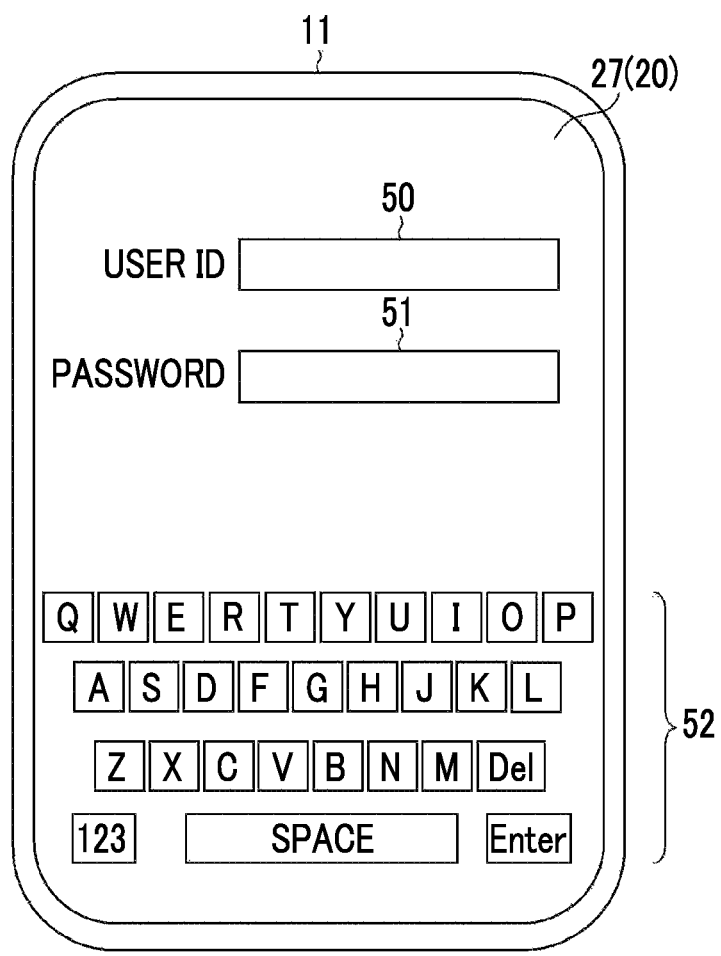
FIG. 3 illustrates an example of an input screen of user identification data displayed on a display unit of the client terminal.

FIG. 3 illustrates an example of an input screen of the user identification data D1 displayed on the display unit 27 of the client terminal 11. In this example, a portable terminal in which a touch panel provided in the display unit 27 is a user operation unit (the terminal input unit 20) is the client terminal 11.

The user inputs the user ID and the password set for each user to the client terminal 11 for authentication of an appropriate user. In the example illustrated in FIG. 3, a user ID data input field 50, a password input field 51, and a software keyboard 52 are displayed on the display unit 27. The user ID data input field 50 is a field to which the user inputs a user ID, and a password input field 51 is a field to which the user inputs a password. The user inputs an assigned user ID to the user ID data input field 50 and inputs a password to the password input field 51 using the software keyboard 52.

The software keyboard 52 includes any character palette and a touch panel (display unit 27) that are displayed on the display unit 27. If a user touches a place corresponding to each character palette displayed on the display unit 27 of the touch panel, a character or the like corresponding to the touched position is input to the user ID data input field 50 or the password input field 51. The character palette displayed on the display unit 27 as the software keyboard 52 is not particularly limited, and not only input characters such as Hiragana, alphabets, numbers, or symbols, but also function keys such as a space key, an enter key, a delete key, and a display switching key can be displayed on the display unit 27 as the software keyboard 52.

For example, the touch panel (display unit 27) in a position corresponding to the user ID data input field 50 is touched by the user. Accordingly, the client terminal 11 can transition to a user ID input mode, and the user can input the user ID to the user ID data input field 50 using the software keyboard 52. Similarly, for example, if the touch panel in position corresponding to the password input field 51 is touched by the user, the client terminal 11 transitions to a password input mode, and the user can input a password to the password input field 51 using the software keyboard 52. When a position corresponding to the enter key of the software keyboard 52 is touched by the user in a state in which the user identification data and the password are input, an authentication process is performed, and a display of the display unit 27 transition to a search process screen in a case in which a result of the authentication, the user identification data, and the password are appropriate.

Figure 4:
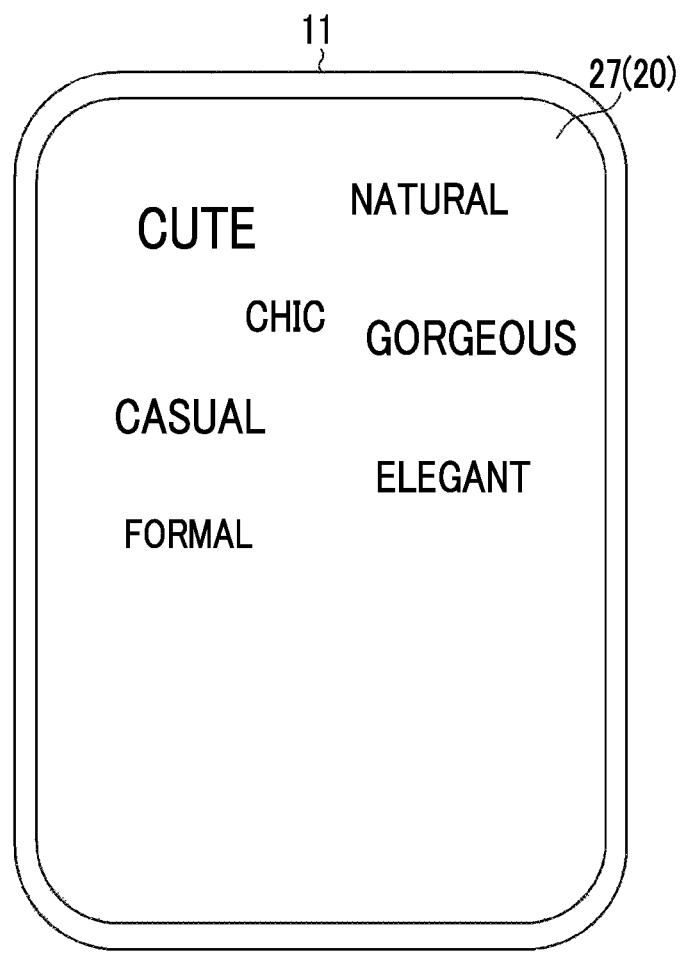
FIG. 4 illustrates an example of a display unit of the client terminal in which a plurality of sensibility words (candidates of search word) are displayed.

FIG. 4 illustrates an example of the display unit 27 of the client terminal 11 on which a plurality of sensibility words (candidates for the search words) are displayed.

The terminal input unit 20 (touch panel) of this example receives an instruction from the user, specifies at least one of a plurality of sensibility words displayed on the display unit 27 in response to the instruction, and specifies sensibility word data D2 indicating the specified sensibility word as "sensibility word data D2 input through the terminal input unit 20". More specifically, the plurality of sensibility words that are candidates for the search word are displayed on the display unit 27, a position corresponding to any one of the plurality of sensibility words displayed on the display unit 27 in the touch panel (the display unit 27) is touched by the user, and accordingly, the sensibility word corresponding to the touch position is input as a search word.

A display aspect of the plurality of sensibility words on the display unit 27 is not particularly limited, and the plurality of sensibility words may be displayed in an orderly manner according to a predetermined rule on the display unit 27 or may be displayed at random. Further, the display of the plurality of sensibility words on the display unit 27 may be a so-called "tag cloud" display, or display sizes of the sensibility words on the display unit 27 may be different from each other. In the example of FIG. 4, a sensibility word "cute" is displayed in a largest size, sensibility words "casual" and "gorgeous" are displayed in a smaller size, sensibility words "chic", "natural", and "elegant" are displayed in much smaller size, and a sensibility word "formal" is displayed in a smallest size.

A plurality of sensibility words displayed on the display unit 27 may be determined in advance or may be changed for each search process. Further, a plurality of sensibility word data displayed on the display unit 27 may be stored in the client terminal 11 in advance or may be transmitted from the server system 10 to the client terminal 11 (the display control unit 25 (see FIG. 2)). In this case, the display control unit 25 may display candidates (a plurality of sensibility words) of the search word in a tag cloud form on the display unit 27 based on the sensibility word data transmitted from the server system 10 via the terminal external input and output unit 23 (the terminal reception unit 22) in each search process. Further, a plurality of sensibility words data transmitted from the server system 10 to the client terminal 11 is not particularly limited and may be changed according to, for example, a frequency of designation as the search word in the search process in the server system 10, an attribute of the user, or the like.

The terminal transmission unit 21 (see FIG. 2) transmits data such as the user identification data D1 and the sensibility word data D2 (search word) specified by the user through the terminal input unit 20, to the server system 10 over the network 12 (see FIG. 1). Further, the terminal reception unit 22 receives the data such as "search result data D5 (image data of a product)" and "display information data D6" to be described below which is transmitted from the server system 10 over the network 12. The terminal transmission unit 21 and the terminal reception unit 22 constitute the terminal external input and output unit 23, and the terminal transmission unit 21 and the terminal reception unit 22 may be configured of the same device.

The display control unit 25 controls the display unit 27 to control the entire display of the display unit 27 and perform, for example, switching to a screen display (FIG. 3) of a designation mode (a user ID input mode and a password input mode) of the user identification data D1 and a screen display (see FIG. 4) of the designation mode of the sensibility word data D2 (search word) on the display unit 27. Further, the display control unit 25 displays image data of the product received by the terminal reception unit 22 on the display unit 27 according to the display information data received by the terminal reception unit 22.

The terminal system controller 28 (see FIG. 2) controls the terminal external input and output unit 23 (the terminal transmission unit 21 and the terminal reception unit 22), the terminal input unit 20, and the display control unit 25 to cause each unit to execute the above-described process or another process, and also controls each unit (not illustrated) of the client terminal 11. For example, in the user authentication process (see FIG. 3), the terminal system controller 28 controls the terminal input unit 20 and the terminal external input and output unit 23, and transmits the user identification data D1 input by the user via the terminal input unit 20 to the server system 10 via the terminal transmission unit 21 and the network 12. Further, the terminal system controller 28 controls the terminal input unit 20, the terminal reception unit 22, and the display control unit 25, receives a result of user authentication, candidates (a plurality of sensibility word data) of the search word (see FIG. 4), the search result data D5, the display information data D6, and the like transmitted from the server system 10. A display of appropriateness of the user authentication, a tag cloud display of the search word (see FIG. 4), a display of the search product image 66 (FIGS. 13A to 13D), or the like on the display unit 27 is performed.

In a case in which the user operates the client terminal 11 having the above-described configuration and performs the product search, the user inputs the user identification data D1 (the user ID and the password) and the sensibility word data D2 (the search word) using the terminal input unit 20 (the touch panel). The user identification data D1 and the sensibility word data D2 input and specified by the user via the terminal input unit 20 are transmitted from the terminal input unit 20 to the terminal transmission unit 21, and transmitted to the server system 10 over the network 12 by the terminal transmission unit 21.

Next, a functional configuration of the server system 10 will be described.

Figure 5:
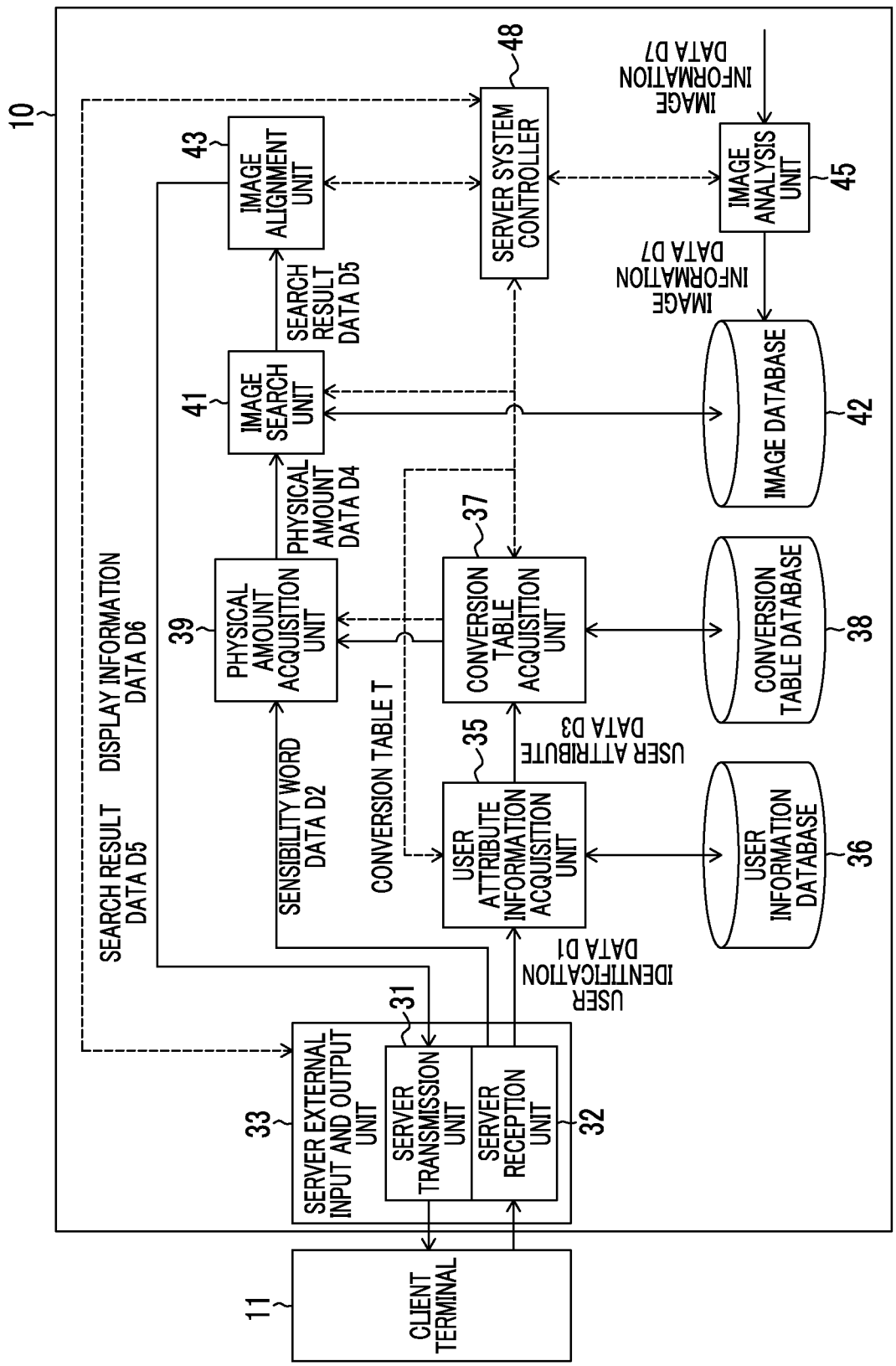
FIG. 5 is a block diagram illustrating an example of a functional configuration of the server system.

FIG. 5 is a block diagram illustrating an example of a functional configuration of the server system 10.

The server system 10 of this example includes a server external input and output unit 33 (a server transmission unit 31 and a server reception unit 32), a user attributes information acquisition unit 35, a conversion table acquisition unit 37, a physical amount acquisition unit 39, an image search unit 41, an image alignment unit 43, an image analysis unit 45, a user information database 36, a conversion table database 38, an image database 42, and a server system controller 48.

The server reception unit 32 receives data such as the user identification data D1 and the sensibility word data D2 (search word) transmitted from the client terminal 11 over the network 12, transmits the user identification data D1 to the user attributes information acquisition unit 35, and transmits the sensibility word data D2 to the physical amount acquisition unit 39.

The user attributes information acquisition unit 35 accesses the user information database 36, and acquires user attributes data D3 associated with the user identification data D1 received from the client terminal 11 over the network 12 and the server reception unit 32.

Figure 6:
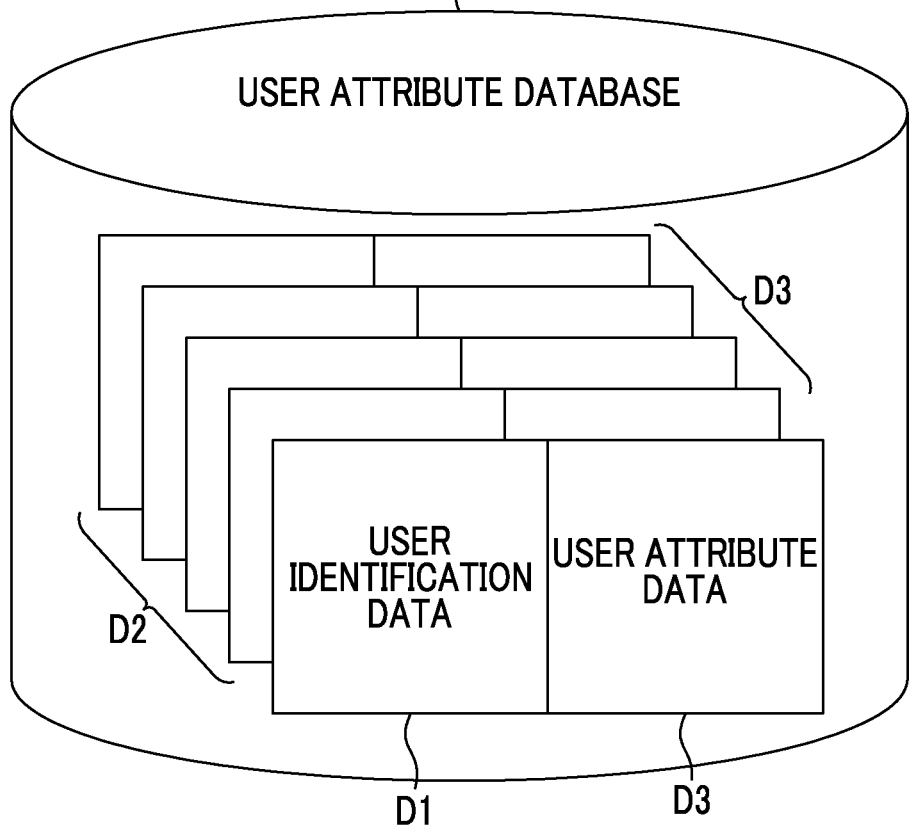
FIG. 6 is a data structure conceptual diagram illustrating a correspondence relationship between user identification data and user attributes data stored in a user information database.
Figure 7:
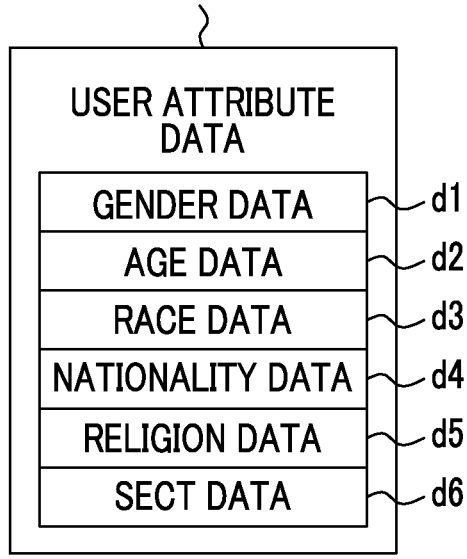
FIG. 7 is a data structure conceptual diagram illustrating an example of configuration data of the user attributes data.

FIG. 6 is a data structure conceptual diagram illustrating a correspondence relationship between the user identification data D1 and the user attributes data D3 stored in the user information database 36. FIG. 7 is a data structure conceptual diagram illustrating an example of configuration data of the user attributes data D3.

The user information database 36 stores the user identification data D1 and the user attributes data D3 in association with each other. Since the user attributes data D3 is stored in association with each piece of user identification data D1 in the user information database 36, if the user identification data D1 is determined, the corresponding user attributes data D3 is determined. The user attributes data D3 is not particularly limited as long as the user attributes data D3 is data indicating the attribute of the user and, for example, data based on at least one of gender data d1, age data d2, race data d3, nationality data d4, religion data d5, or sect data d6 may be the user attributes data D3.

The user attributes data D3 stored in the user information database 36 is previously specified by the user, and the user attributes data D3 specified by the user is stored in the user information database 36 in association with the user identification data D1 (user ID) assigned to the user. For example, when the user initially uses the search system 1, the user attributes data D3 may be input to the client terminal 11 (the terminal input unit 20) together with the user identification data D1 such as a password. In this case, the user identification data D1 and the user attributes data D3 that have been input are transmitted from the client terminal 11 (the terminal transmission unit 21) to the server system 10 (the server reception unit 32), and stored in the user information database 36 in association with each other under the control of the server system controller 48.

The conversion table acquisition unit 37 (see FIG. 5) accesses the conversion table database 38, and acquires a conversion table T that is associated with the user attributes data D3 acquired by the user attributes information acquisition unit 35.

Figure 8:
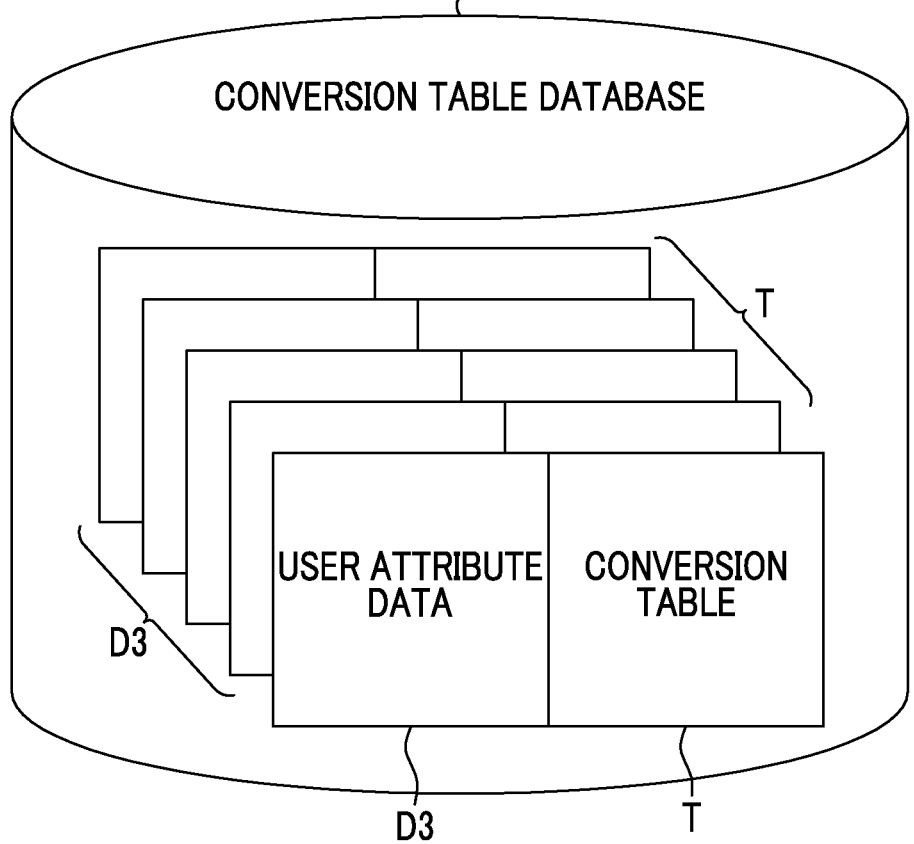
FIG. 8 is a data structure conceptual diagram illustrating a correspondence relationship between user attributes data and a conversion table stored in a conversion table database.
Figure 9:
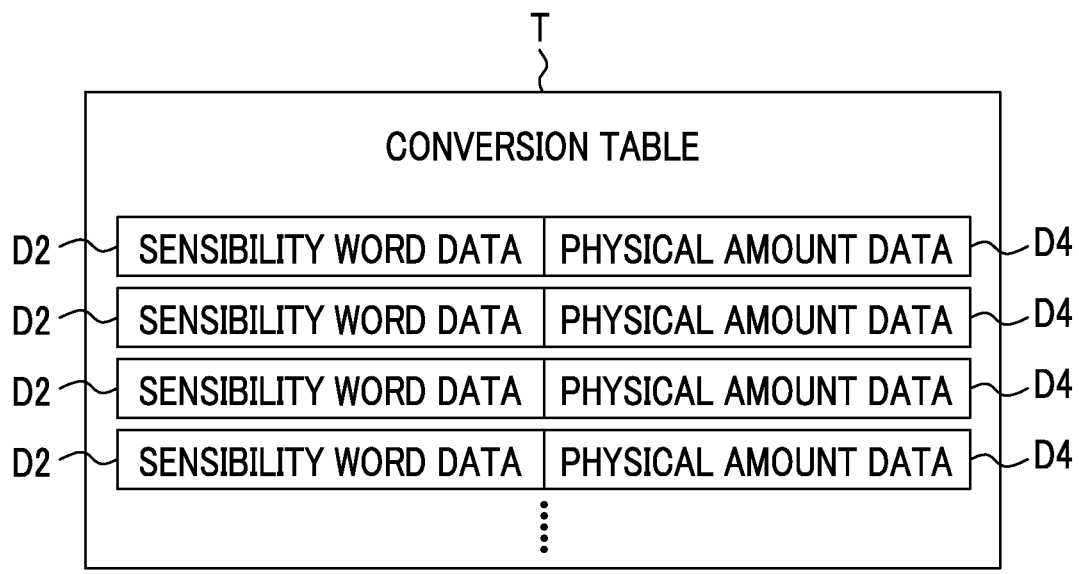
FIG. 9 is a data structure conceptual diagram illustrating an example of configuration data of a conversion table.

FIG. 8 is a data structure conceptual diagram illustrating a correspondence relationship between the user attributes data D3 and the conversion table T stored in the conversion table database 38. FIG. 9 is a data structure conceptual diagram illustrating an example of configuration data in the conversion table T.

Since the conversion table T is determined according to the user attributes data D3 and the user attributes data D3 and the conversion table T are stored in association with each other in the conversion table database 38, if the user attributes data D3 is determined, the corresponding conversion table T is determined. In each of the plurality of conversion tables T stored in the conversion table database 38, the physical amount (the physical amount data D4) of the product and the sensibility word data D2 are associated with each other, and if the sensibility word data D2 is determined, the corresponding physical amount data D4 is also determined.

The "physical amount (physical amount data D4) of the product" is not particularly limited as long as the physical amount is data indicating physical characteristics of the product, and the physical amount data D4 may be, for example, data based on at least one of a color (for example, a representative color) of the product, a pattern (for example, a representative pattern) of the product, a texture of the product, or a shape of the product.

The physical amount acquisition unit 39 (see FIG. 5) of this example acquires the physical amount (physical amount data D4) of the product associated with the sensibility word data D2 (search word) received by the server reception unit 32 from the client terminal 11 over the network 12 by referring to the conversion table T acquired by the conversion table acquisition unit 37. Since the conversion table T acquired by the conversion table acquisition unit 37 is determined according to the user attributes data D3 as described above, the physical amount data D4 acquired by the physical amount acquisition unit 39 may also be changed according to the user attributes data D3.

Figure 10:
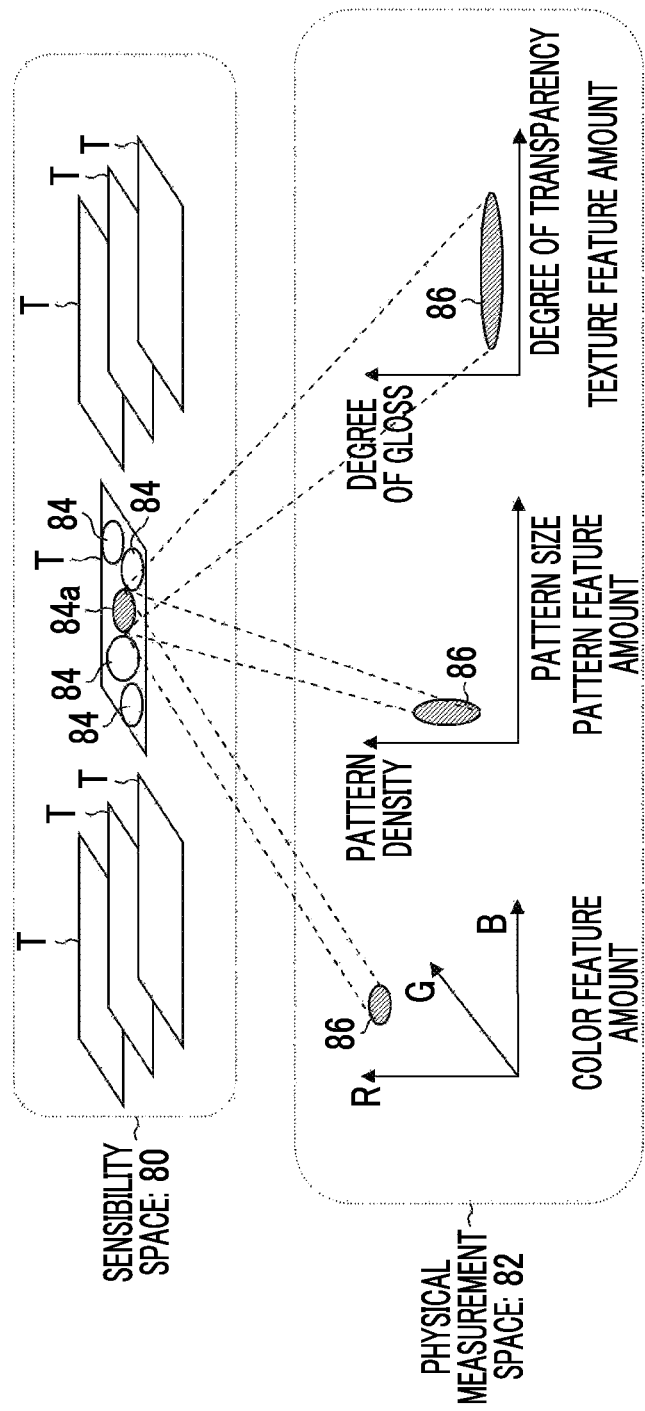
FIG. 10 is a conceptual diagram illustrating a relationship between sensibility word data (sensibility space) and physical amount data (physical measurement space) defined by a conversion table.

FIG. 10 is a conceptual diagram illustrating a relationship between the sensibility word data D2 (a sensibility space 80) and the physical amount data D4 (a physical measurement space 82) defined by the conversion table T.

The conversion table T defines an area in the physical measurement space 82 (hereinafter referred to as a "physical amount area 86") corresponding to an area in the sensibility space 80 (hereinafter referred to as a "sensibility area 84"). That is, if it is assumed that there is the sensibility area 84 assigned to each piece of sensibility word data D2 in the sensibility space 80, there is the physical amount area 86 (the physical amount data D4) in the physical measurement space 82 corresponding to each sensibility area 84. In the example illustrated in FIG. 10, in a case in which certain sensibility word data D2 occupies the sensibility area 84a, a specific physical amount area 86 (physical amount data D4) in the physical measurement space 82 regarding a color feature amount, a pattern feature amount, and a texture feature amount is associated with the sensibility area 84a (see a diagonal portion in FIG. 10).

The conversion table T defines this "association between the sensibility area 84 of the sensibility word data D2 represented in the sensibility space 80 and the physical amount area 86 of the physical amount data D4 represented in the physical measurement space 82", and is used to convert the data in the sensibility space 80 into the data in the physical measurement space 82.

In this embodiment, the conversion table T is prepared for each piece of user attributes data D3, the conversion table T determined by a different criteria is used in a case in which the user attributes data D3 is different, and a specific position of the sensibility area 84 in the sensibility space 80 is different even when the sensibility word is the same. That is, for the same sensibility word, the physical amount (for example, a color, a pattern, a texture, or shape) of the product that is associated from the sensibility word may be different among users whose attributes are different. For example, a physical amount (for example, color, pattern, texture, or shape) of a product associated from a sensibility word "cute" is expected to be greatly different between a "man of 60 years old" and a "women of 10 years old". Since the physical amount acquisition unit 39 of this embodiment uses the "conversion table T according to the user attributes data D3" acquired by the conversion table acquisition unit 37, the physical amount data D4 in which a difference in the "physical amount of the product associated from the sensibility word" between users of which the attributes are different is reflected can be acquired.

The physical amount data D4 acquired by the physical amount acquisition unit 39 is not limited to data regarding a single type of physical amount, and may be data regarding a combination of a plurality of types of physical amounts. For example, the physical amount data D4 acquired by the physical amount acquisition unit 39 may be data regarding a "color of the product" or may be data regarding a combination of the "color of the product" and a "pattern of the product". In a case in which the physical amount data D4 is the data regarding a combination of a plurality of types of physical amounts, the physical amount acquisition unit 39 may acquire the physical amount data D4 by weighting each type of physical amount.

In the example illustrated in FIG. 10, "color feature amount defined by RGB (red, green, and blue) data", "pattern feature amount defined by a pattern density and a pattern size", and "texture feature amount defined by a degree of gloss and a degree of transparency" are used as a reference for determining the physical amount area 86 in the physical measurement space 82, but the present invention is not limited thereto. For example, a shape feature amount defined by a total width (thin-thick), a size (short-long) of a sleeve, a size (short-long) of a length, a width and a height of a neck line (neck), a cross-sectional area (small-large) of a space for passage of a head of the user defined by the neck line, an angle (small-large) of a V neck, a curvature (small-large) of a U neck, or the like may be used as a reference for determining the physical amount area 86. Further, the criteria for determining the sensibility area 84 in the sensibility space 80 is not particularly limited and, for example, the sensibility area 84 can be determined based on any sensibility such as "warm-cool" or "formal-casual".

The image database 42 (see FIG. 5) stores the image data of the product and the physical amount (physical amount data) of the product in association with each other, and the image search unit 41 accesses the image database 42 to acquire the image data of the product associated with the "physical amount (physical amount data D4) of the product" acquired by the physical amount acquisition unit 39.

Figure 11:
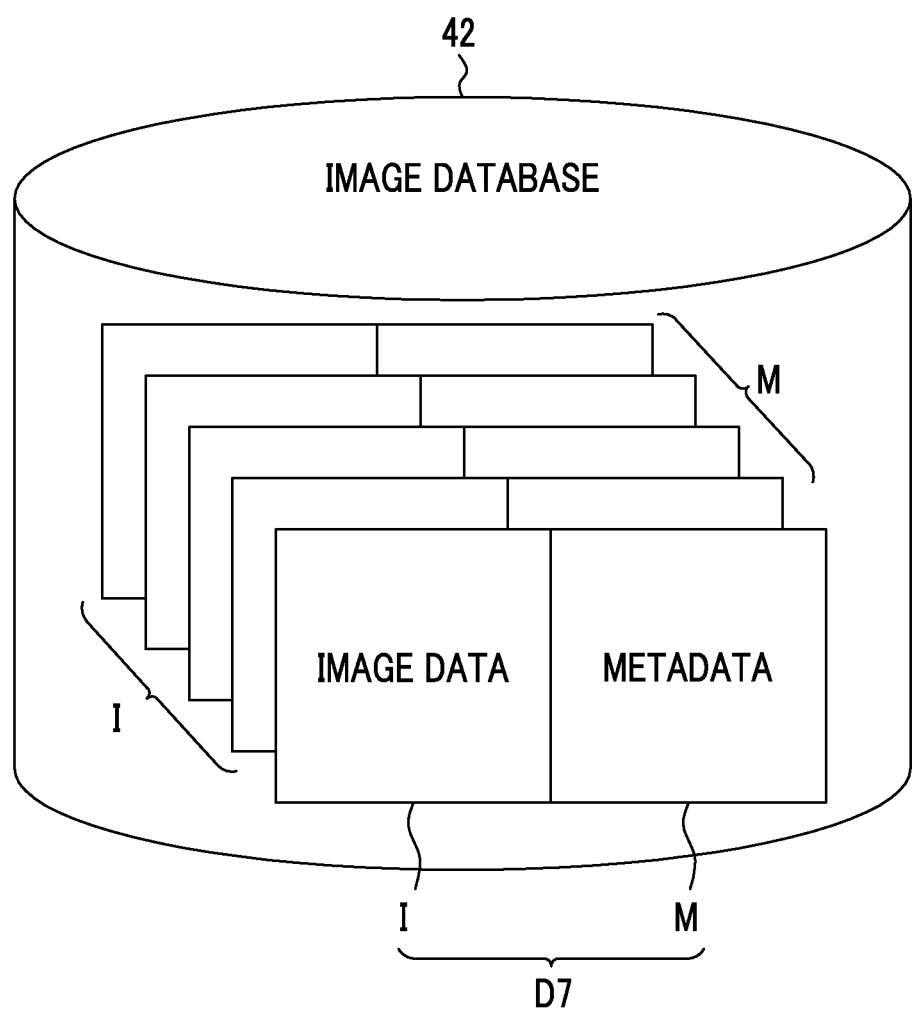
FIG. 11 is a data structure conceptual diagram illustrating a correspondence relationship between image data and metadata stored in an image database.
Figure 12:
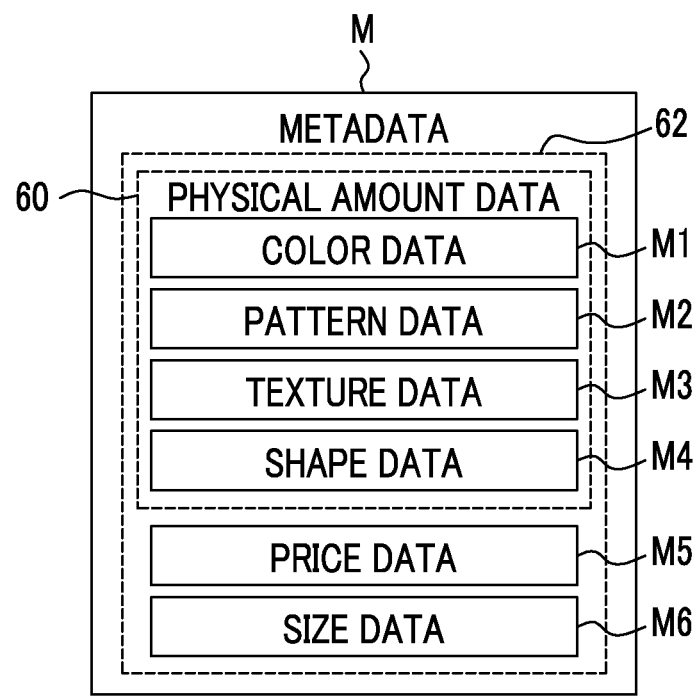
FIG. 12 is a data structure conceptual diagram illustrating an example of configuration data of metadata.

FIG. 11 is a data structure conceptual diagram illustrating a correspondence relationship between image data I and metadata M stored in the image database 42. FIG. 12 is a data structure conceptual diagram illustrating an example of configuration data of the metadata M.

The metadata M indicating the physical amount of the product is added to the image data I of the product stored in the image database 42, and the image data I of a plurality of the products is stored together with the metadata M in the image database 42.

The image data I of each product is acquired by imaging the product. Further, the physical amount (physical amount data portion 60) of the product included in the metadata M associated with the image data I of each product is acquired by analyzing the image data I of the product.

That is, the metadata M includes a characteristics data portion 62 representing the characteristics of the product, and this characteristics data portion 62 includes a physical amount data portion 60 representing a physical amount of the product, and characteristics data indicating other characteristics of the product. In the physical amount data portion 60 cited here, for example, color data M1, pattern data M2, texture data M3, and shape data M4 obtained by analyzing the image data I of the product are included in the physical amount data portion 60. The color data M1 can be specified, for example, based on RGB (red, green and blue) data, the pattern data M2 can be specified based on, for example, a pattern density and a pattern size, and the texture data M3 can be specified based on, for example, a degree of gloss and a degree of transparency. Further, the shape data M4 can be specified, for example, based on a total width (thin-thick), a size (short-long) of a sleeve, a size (short-long) of a length, a width and a height of a neck line (neck), a cross-sectional area (small-large) of a space for passage of a head of the user defined by the neck line, an angle (small-large) of a V neck, a curvature (small-large) of a U neck, or the like. On the other hand, the characteristics data other than the physical amount data portion 60 included in the characteristics data portion 62 can be determinable using a scheme other than the analysis of the image data I of the product, and includes, for example, price data M5 of the product individually defined by a provider of the product images, and size data M6 of the product.

In this example, the physical amount data portion 60 is obtained by the image analysis unit 45 (see FIG. 5). That is, image information data D7 including the "metadata M including no physical amount data portion 60" and the "image data I acquired by imaging the product" is input to the image analysis unit 45. The image analysis unit 45 adds the physical amount data portion 60 acquired by analyzing the image data I included in the image information data D7 to the metadata M, and outputs the image information data D7 including the "metadata M including the physical amount data portion 60" and the "image data I" to the image database 42 to cause the image information data D7 to be stored in the image database 42. Thus, the image analysis unit 45 analyzes the image data I of the product to acquire the physical amount (the physical amount data portion 60) of the product, and stores the acquired physical amount (the physical amount data portion 60) of the product in association with the image data I of the product in the image database 42.

The image search unit 41 accesses the image database 42 to acquire the image data of the product associated with the physical amount (physical amount data D4) of the product acquired by the physical amount acquisition unit 39. That is, the image search unit 41 acquires the image data I of the product to which the metadata M indicating the physical amount (physical amount data D4) of the product acquired by the physical amount acquisition unit 39 is added, as the image data I of the product associated with the physical amount of the product acquired by the physical amount acquisition unit 39.

For example, in a case in which the physical amount data D4 is related to "color of the product", the image data I (for example, the image data I in which the "color data M1" indicates "red") to which metadata M indicating a color (for example, "red") associated with the sensibility word data D2 input to the physical amount acquisition unit 39 is added is acquired by the image search unit 41. Further, in a case in which the physical amount data D4 is data regarding a combination of a plurality of types of physical amounts, the image data I to which metadata M indicating a plurality of types of physical amounts indicated by the physical amount data D4 is added is acquired by the image search unit 41. For example, in a case in which the physical amount data D4 is related to the "color of the product" and the "pattern of the product", the image data I to which the metadata M indicating the color and the pattern associated with the sensibility word data D2 input to the physical amount acquisition unit 39 is acquired by the image search unit 41. Further, in a case in which the physical amount data D4 is data that is related to a combination of a plurality of types of physical amounts and to which weighting according to the type of physical amount is applied, the image data I to which metadata M representing the plurality of types of physical amounts indicated by the physical amount data D4 is added according to the weighting is acquired by the image search unit 41.

The image alignment unit 43 determines a display aspect of the image data I of the product acquired through search by the image search unit 41, and generates the display information data D6 indicating the determined display aspect. That is, the image alignment unit 43 determined that the display aspect of the image data I of the product acquired by the image search unit 41 is an aspect in which the image data I of the product is displayed according to characteristics data of the product, and generates display information data D6 indicating the determined display aspect.

The display information data D6 generated by the image alignment unit 43 indicates a display aspect in which at least a portion of the image data I of the product acquired by the image search unit 41 is displayed on a coordinate system representing the characteristics data of the product. The "characteristics data of the product" described here is determined based on characteristics different from the sensibility word data (search word) that the user specifies through the client terminal 11 among the characteristics of the product. For example, the "characteristics data of the product" may be determined based on data (the price data M5 and the size data M6 in FIG. 12) of at least one of the price of the product and the size of the product.

Figure 13B:
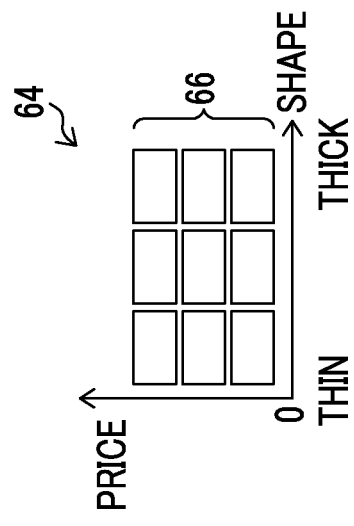
FIGS. 13A to 13D illustrate examples of a display aspect of image data of a product acquired by an image search unit.
Figure 13D:
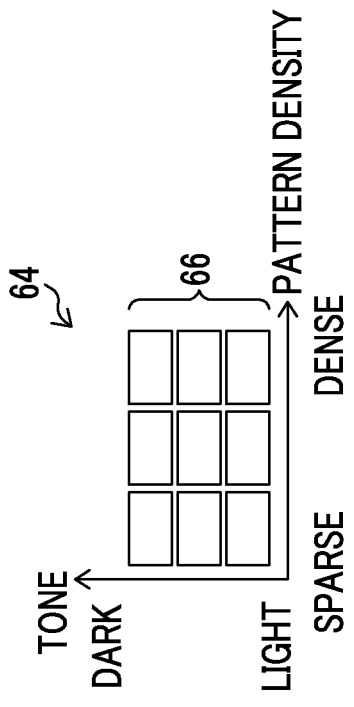
Figure 13A:
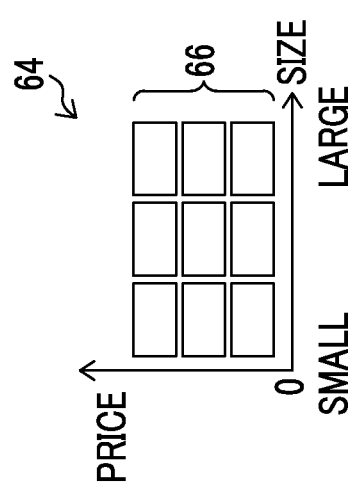
Figure 13C:
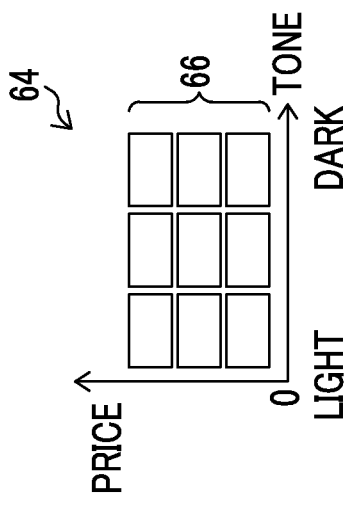

FIGS. 13A to 13D illustrate examples of a display aspect of the image data I of the product acquired by the image search unit 41. In FIG. 13A, a horizontal axis indicates a "size (large and small)" of the product, and a vertical axis indicates "price" of the product. In FIG. 13B, a horizontal axis indicates a "shape (thick and thin)" of the product, and a vertical axis indicates "price" of the product. In FIG. 13C, a horizontal axis indicates "tone (dark and light)" of the product, and a vertical axis indicates "price" of the product. In FIG. 13D, a horizontal axis indicates a "pattern density (dense and sparse)" of the product, and a vertical axis indicates "tone (dark and light)" of the product. A plurality of product images 66 (a total of nine product images including three product images in a horizontal direction and three product images in a vertical direction in FIGS. 13A to 13D) (the image data I) are shown in a coordinate system 64 illustrated in each of FIGS. 13A to 13D.

Thus, the image alignment unit 43 (see FIG. 5) generates the display information data D6 indicating the display aspect (see FIGS. 13A to 13D) in which "the image data I (product images 66) of the product acquired through search by the image search unit 41" included in the search result data D5 is displayed on the coordinate system 64. The example in which the plurality of product images 66 are displayed on the two-dimensional coordinate system 64 is illustrated in FIGS. 13A to 13D, but the present invention is not limited thereto, and the display information data D6 may indicate the display aspect in which a plurality of product images 66 are displayed "one-dimensionally" or "multi-dimensionally such as three-dimensionally".

The server transmission unit 31 transmits the search result data D5 (including the image data I of the product) acquired by the image search unit 41 and the display information data D6 generated by the image alignment unit 43 to the client terminal 11 over the network 12. The search result data D5 and the display information data D6 transmitted by the server transmission unit 31 are received by the terminal reception unit 22 of the client terminal 11 (see FIG. 2). The display control unit 25 determines the display aspect of the "image data I (product images 66) of the product acquired through the search by the image search unit 41" based on the received display information data D6, and displays the image data I (the product image 66) of the product on the display unit 27 according to the determined display aspect (see FIGS. 13A to 13D).

The server system controller 48 controls the server external input and output unit 33 (the server transmission unit 31 and the server reception unit 32), the user attributes information acquisition unit 35, the conversion table acquisition unit 37, the physical amount acquisition unit 39, the image search unit 41, the image alignment unit 43, and the image analysis unit 45 to cause respective units to execute the above-described processes or other processes, and also controls respective units (not illustrated) of the server system 10. For example, in the user authentication process (see FIG. 3), the server system controller 48 receives the user identification data D1 transmitted from the client terminal 11 through the server reception unit 32, accesses an ID and password database (not illustrated), determines whether or not the received user identification data D1 is appropriate, and transmits a result of the determination to the client terminal 11 via the server transmission unit 31. Further, in a case in which a tag cloud display of the search word is performed on the display unit 27 of the client terminal 11, the server system controller 48 accesses a search word database (not illustrated), selects a plurality of sensibility word data used in the tag cloud display (see FIG. 4) based on various types of information such as the user attributes data D3, and transmits the plurality of sensibility word data to the client terminal 11 via the server transmission unit 31.

A specific form for realizing functional configurations of the server system 10 illustrated in FIG. 5 is not particularly limited, and all of the functional configurations of the server system 10 illustrated in FIG. 5 may be realized by a single server or may be realized by a plurality of servers.

Figure 14:
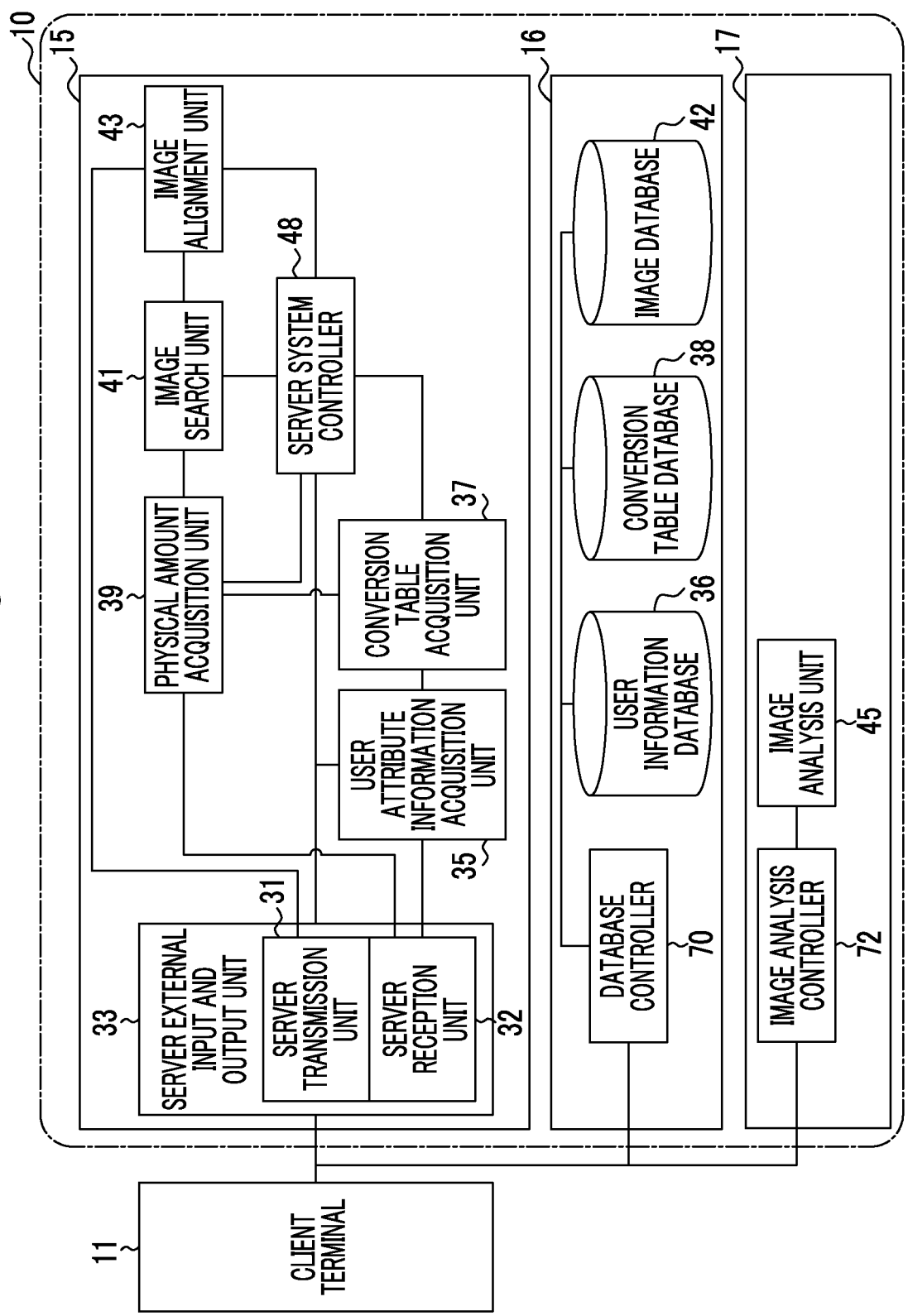
FIG. 14 is a block diagram illustrating an example of a functional configuration of a server system, and is a diagram illustrating a case in which a functional configuration of the server system is realized by a plurality of servers.

FIG. 14 is a block diagram illustrating an example of the functional configuration of the server system 10 and is a diagram illustrating a case in which the functional configuration of the server system 10 is realized by a plurality of servers.

The server system 10 of this example includes a Web server 15, a database server 16, and an image analysis server 17. The Web server 15 includes the server system controller 48, the server external input and output unit 33 (the server transmission unit 31 and the server reception unit 32), the user attributes information acquisition unit 35, the conversion table acquisition unit 37, the physical amount acquisition unit 39, the image search unit 41, and the image alignment unit 43 described above. The database server 16 includes a database controller 70 that controls the user information database 36, the conversion table database 38, and the image database 42 described above, in addition to these databases. The image analysis server 17 includes an image analysis controller 72 that controls the image analysis unit 45, in addition to the image analysis unit 45 described above.

Each of the database server 16 and the image analysis server 17 includes the same data input and output unit as the server external input and output unit 33 (the server transmission unit 31 and the server reception unit 32) of the Web server 15, but the data input and output unit is not illustrated.

Each unit of the Web server 15 is controlled by the server system controller 48, and each unit of the database server 16 is controlled by the database controller 70, and each unit of the image analysis server 17 is controlled by the image analysis controller 72.

For example, in a case in which the user attributes information acquisition unit 35 acquires the user attributes data D3 from the user identification data D1, the user attributes information acquisition unit 35 accesses the user information database 36 via the server external input and output unit 33 and the database controller 70 to acquire the user attributes data D3 associated with the user identification data D1. Similarly, the conversion table acquisition unit 37 accesses the conversion table database 38 via the server external input and output unit 33 and the database controller 70, and the image search unit 41 accesses the image database 42 via the server external input and output unit 33 and the database controller 70.

Further, the image analysis unit 45 stores the image information data D7 after image analysis in the image database 42 via the image analysis controller 72 and the database controller 70.

The server system 10 configured of a plurality of servers is not limited to the example illustrated in FIG. 14. For example, any two servers among the Web server 15, the database server 16, and the image analysis server 17 illustrated in FIG. 14 may be realized by a single server. Further, some of the databases (the user information database 36, the conversion table database 38, and the image database 42) included in the database server 16 illustrated in FIG. 14 may be provided in the Web server 15.

Further, the server system 10 and the client terminal 11 may be provided in the same country over the network 12 or may be provided in different countries. In a case in which the server system 10 is realized by a plurality of servers, some or all of the plurality of servers may be provided in different countries.

Figure 15:
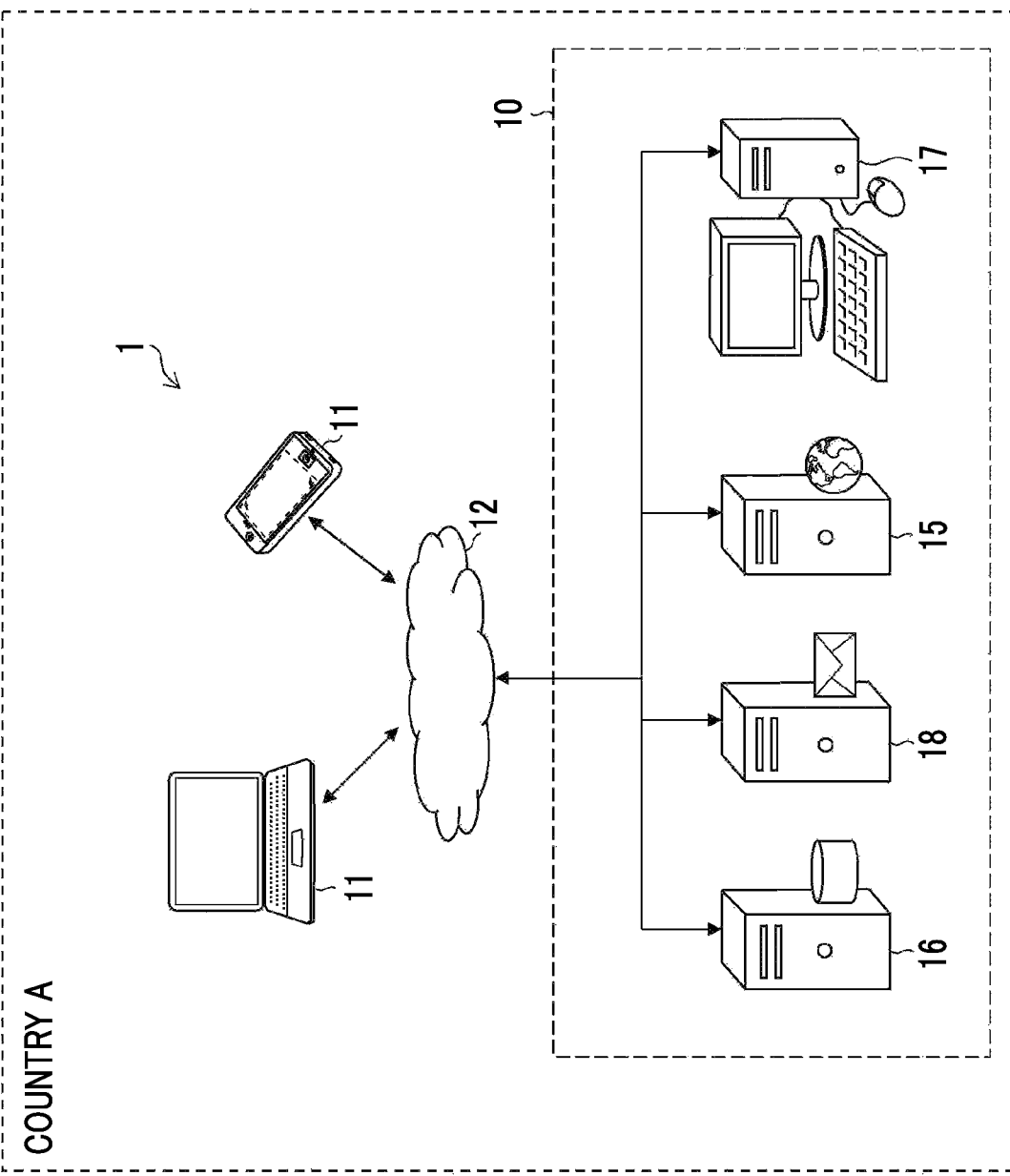
FIG. 15 is a conceptual diagram illustrating an example of a search system in a case in which a server system and a client terminal are present in one country (country A).
Figure 16:
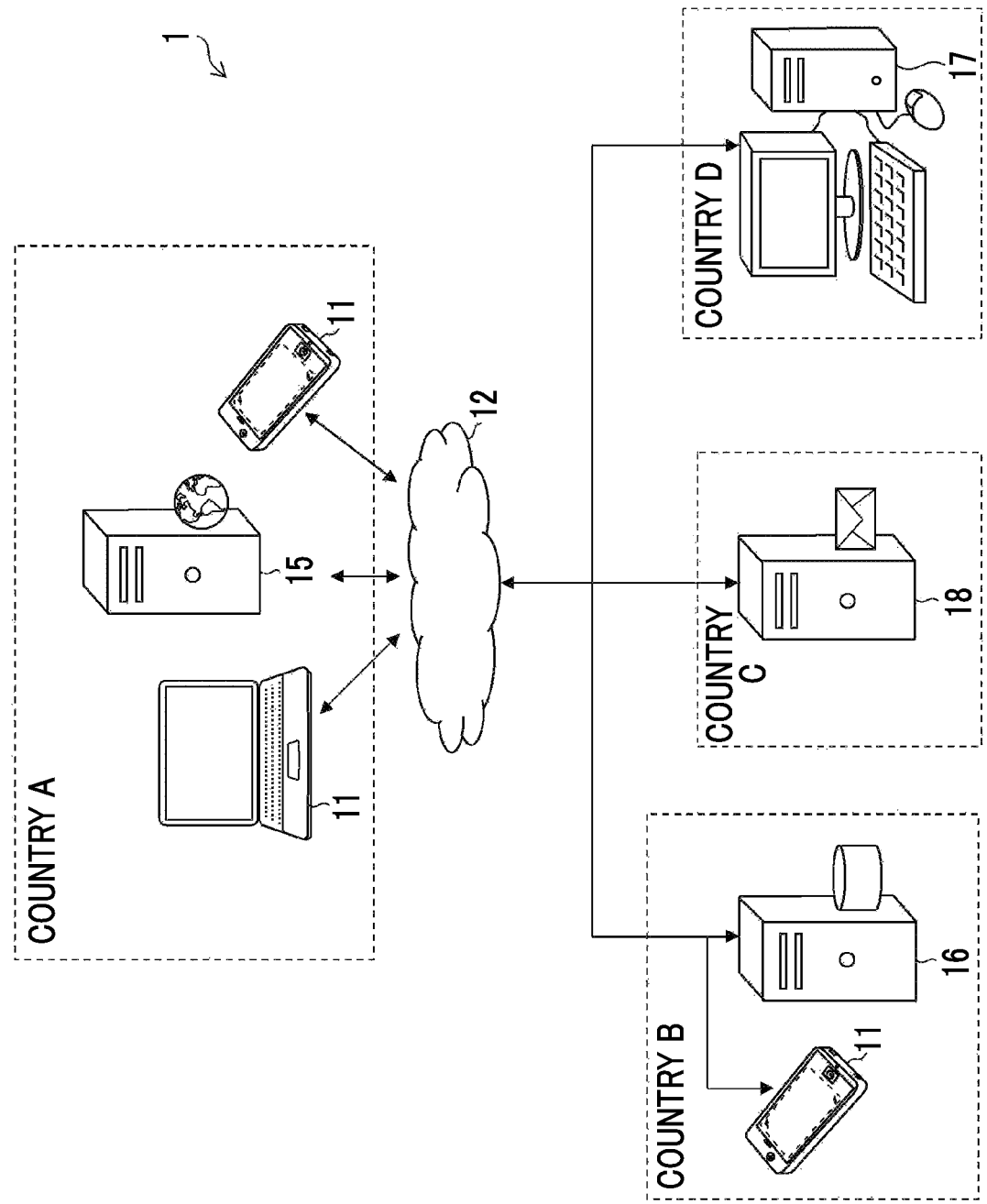
FIG. 16 is a conceptual diagram illustrating an example of a search system in a case in which a server system and a client terminal are present in a plurality of countries (country A to country D).

FIG. 15 is a conceptual diagram illustrating an example of the search system 1 in a case in which there are the server system 10 and the client terminal 11 in one country (country A). FIG. 16 is a conceptual diagram illustrating an example of the search system 1 in a case in which there are the server system 10 and the client terminal 11 over a plurality of countries (country A to country D).

The server system 10 illustrated in FIGS. 15 and 16 includes the Web server 15, the database server 16, the image analysis server 17, and a mail server 18. The Web server 15, the database server 16, and the image analysis server 17 can be configured, for example, similar to the server system 10 illustrated in FIG. 14, and the mail server 18 is a server that performs transmission and reception of an e-mail to and from the client terminal 11.

In the example illustrated in FIG. 16, the Web server 15 is placed in country A, the database server 16 is placed in country B, the mail server 18 is placed in country C, and the image analysis server 17 is placed in country D. Further, the client terminal 11 may also be present in a plurality of countries. The client terminal 11 may be present in the country A and country B, as illustrated in FIG. 16.

Next, a flow of a search process will be described.

Figure 17:
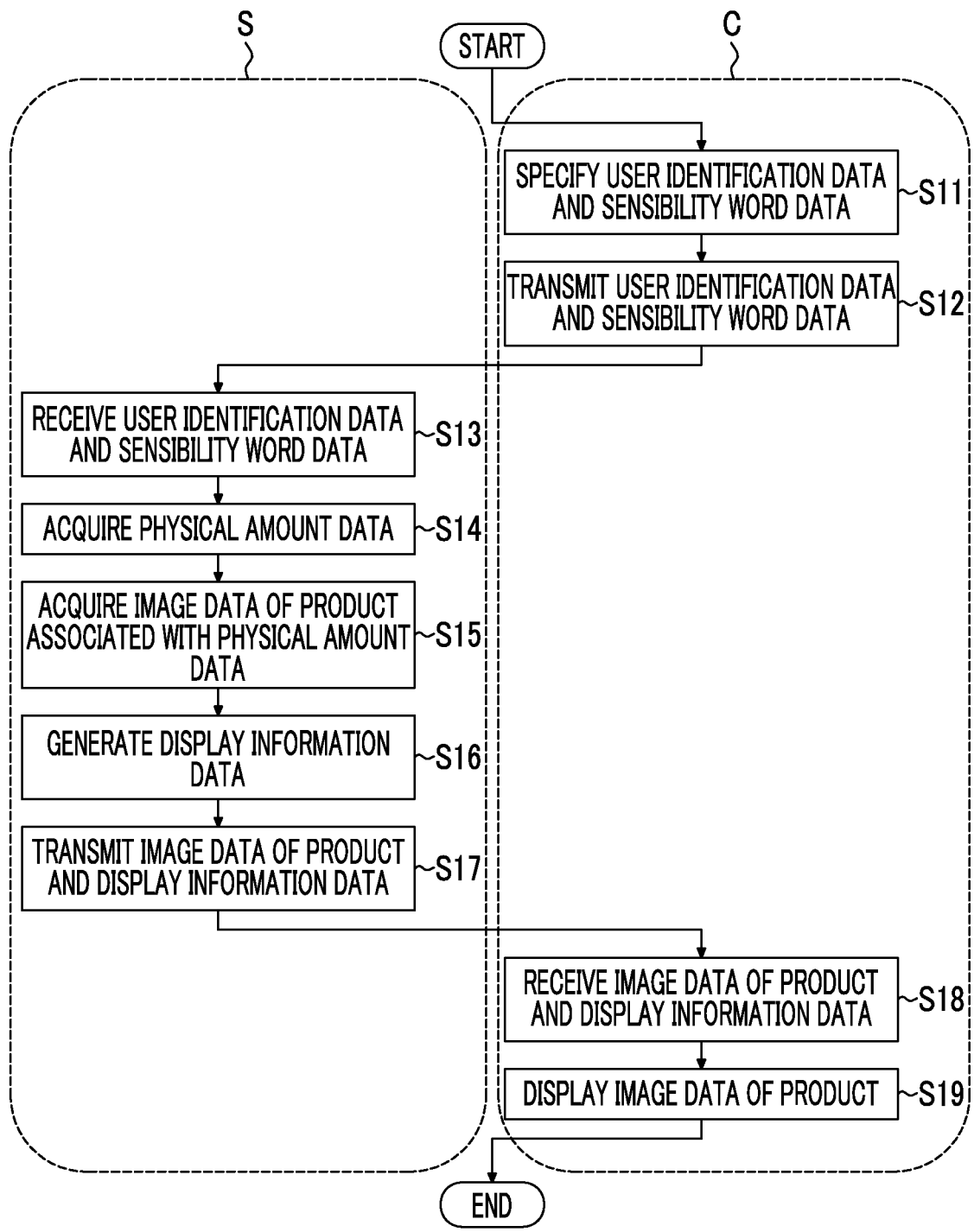
FIG. 17 is a flowchart of a search process and a search results display process.

FIG. 17 is a flowchart of a search process and a search result display process. In FIG. 17, "S (S13 to S17)" indicates a process mainly performed by the server system 10, and "C (S11 to S12 and S18 to S19)" indicates a process mainly performed by the client terminal 11.

In a case in which product search is performed in the search system 1 of this embodiment, the user specifies the user identification data D1 and the sensibility word data D2 as a search word via the terminal input unit 20 (S11 in FIG. 17). The user identification data D1 and the sensibility word data D2 specified through the terminal input unit 20 are transmitted to the server system 10 via the terminal transmission unit 21 and the network 12 (S12).

The user identification data D1 and the sensibility word data D2 transmitted from the client terminal 11 are received by the server reception unit 32 (S13), the user identification data D1 is sent to the user attributes information acquisition unit 35, and the sensibility word data D2 is sent to the physical amount acquisition unit 39. The user attributes data D3 is acquired from the user identification data D1 by the user attributes information acquisition unit 35, the corresponding conversion table T is acquired from the user attributes data D3 by the conversion table acquisition unit 37, and the acquired conversion table T is sent to the physical amount acquisition unit 39. The physical amount data D4 is acquired from the user identification data D1 and the conversion table T by the physical amount acquisition unit 39 and sent to the image search unit 41 (S14).

Image data (search result data D5) of the product associated with the physical amount data D4 is searched for and acquired from the image data I stored in the image database 42 by the image search unit 41 (S15), and the display information data D6 indicating the display aspect of the acquired image data of the product is acquired by the image alignment unit 43 (S16). The acquired search result data (image data of the product) D5 and the display information data D6 are sent to the client terminal 11 via the server transmission unit 31 (S17).

The search result data D5 (image data of the product) and the display information data D6 transmitted from the server system 10 are received by the terminal reception unit 22 and the display control unit 25 (S18), and the image data of the product acquired through search is displayed on the display unit 27 according to the display aspect indicated by the display information data D6 (S19).

As described above, according to the search system 1 of this embodiment, a plurality of conversion tables T according to the attribute of the user are prepared and stored, and the conversion tables T actually used for product search are switched according to attribute of the user. Thus, the attribute (user attributes data D3) of the user is acquired for each user and the conversion tables T are switched according to the attribute. Accordingly, it is possible to perform appropriate product search according to the attribute.

Further, the physical amount is directly associated with the product, and the sensibility word and the product are associated with each other through the sensibility space 80 and the physical measurement space 82 (FIG. 10), instead of a sensibility feature amount (sensibility word data) being directly associated with the product. Therefore, in search using the sensibility word that may be changed according to a user attribute, a period of time, or the like, it is possible to appropriately perform the "association between the sensibility word and the product" suitable for the attributes, the period of time, or the like by adjusting the association between the area (sensibility word data) of the sensibility space 80 and the area (physical amount data) of the physical measurement space 82. It is possible to perform highly accurate product search by using the conversion table T optimized by dynamically changing the relationship between the physical measurement value and the sensibility word as above.

Further, the image data of the product selected through the search is displayed on the coordinate system 64, which uses a characteristic amount (for example, a price or a size) different from the sensibility word specified by the user as a reference. Accordingly, the user intuitively can confirm a search result according to the characteristic amount and immediately perform purchase decision. Thus, the search system 1 of this embodiment may prompt purchase decision of a user by performing a "convenient search using an intuitive sensibility word" and a "display of an intuitively recognizable search result image".

Thus, according to this embodiment, it is possible to conveniently and accurately specify a plurality of product images according to a preference of the user using the sensibility word and to display the product images so that a relationship among the plurality of product images is intuitively understood by the user.

Each functional configuration described above can be realized by any hardware, any software, or a combination of both. For example, the present invention can also be applied to a program for causing a computer to execute a processing method and a method of controlling the entire process in the respective units of the server system 10 and the client terminal 11 described above, a computer-readable recording medium (a non-transitory recording medium) having the program recorded thereon, or a computer in which the program can be installed.

Further, the client terminal 11 of the present invention is not particularly limited, and may include a mobile phone or a smartphone, a personal digital assistant (PDA), and a portable game machine. Hereinafter, an example of a smartphone to which the present invention can be applied will be described.

<Configuration of Smartphone>

Figure 18:
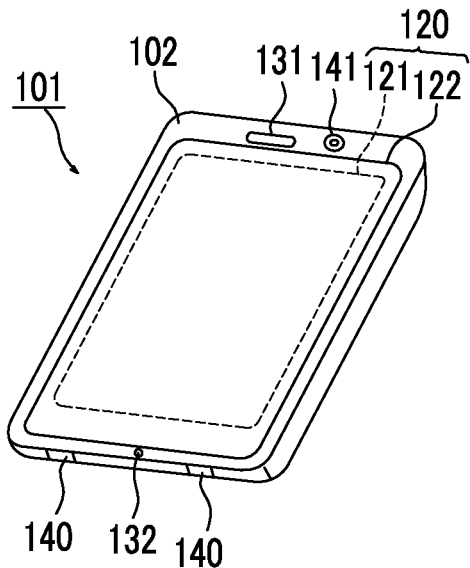
FIG. 18 is a diagram illustrating an appearance of a smartphone.

FIG. 18 is a diagram illustrating an appearance of a smartphone 101. The smartphone 101 illustrated in FIG. 18 has a flat casing 102, and includes a display and input unit 120 in which a display panel 121 as a display unit and an operation panel 122 as an input unit are integrally formed on one surface of the casing 102. Further, the casing 102 includes a speaker 131, a microphone 132, an operation unit 140, and a camera unit 141. The configuration of the casing 102 is not limited thereto and, for example, a configuration in which the display unit and the input unit may be independent from each other may be adopted, or a configuration having a folding structure and a slide mechanism may be adopted.

Figure 19:
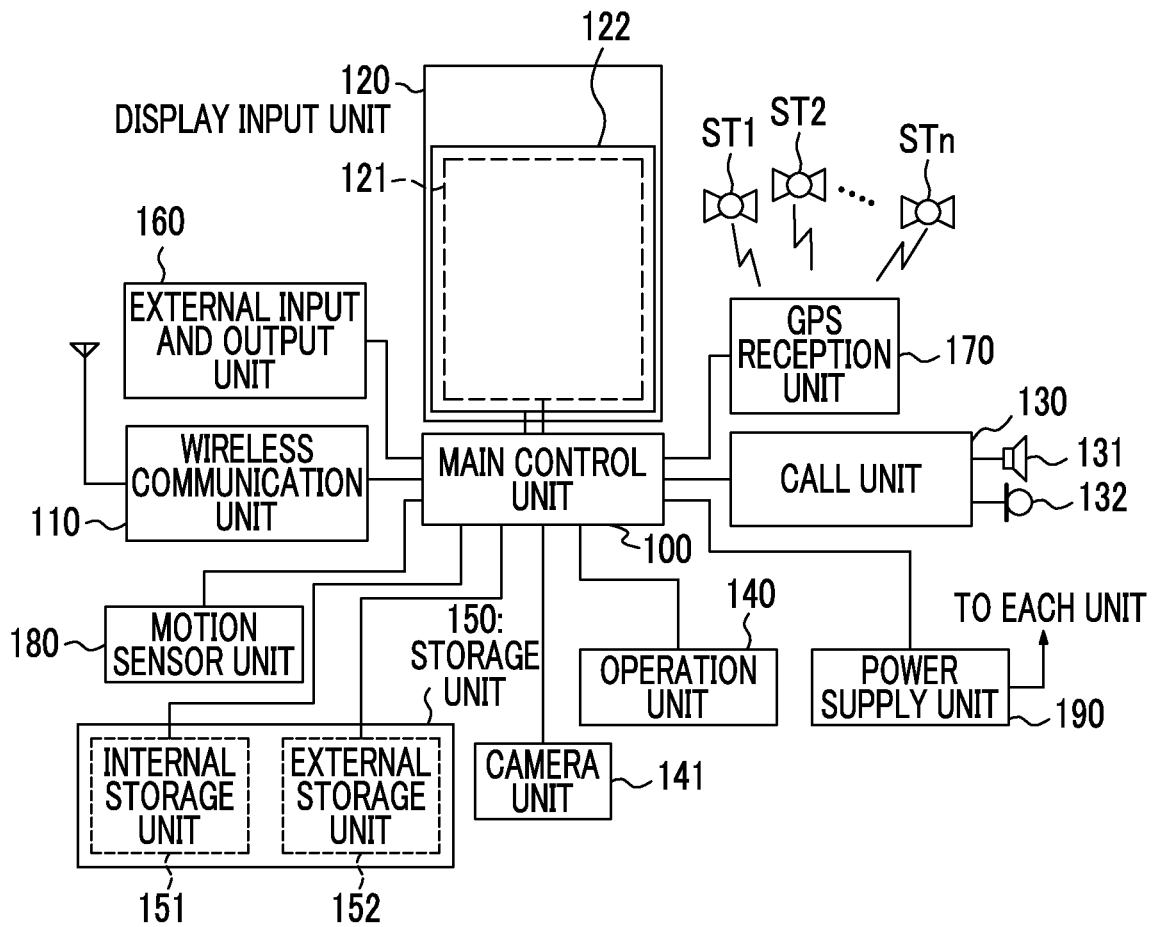
FIG. 19 is a block diagram illustrating a configuration of the smartphone illustrated in FIG. 18.

FIG. 19 is a block diagram illustrating a configuration of the smartphone 101 illustrated in FIG. 18. As illustrated in FIG. 19, main components of the smartphone includes a wireless communication unit 110, a display and input unit 120, a call unit 130, an operation unit 140, a camera unit 141, a storage unit 150, an external input and output unit 160, a global positioning system (GPS) reception unit 170, a motion sensor unit 180, a power supply unit 190, and a main control unit 100. Further, main functions of the smartphone 101 include a wireless communication function of performing mobile wireless communication with a base station apparatus through a mobile communication network.

The wireless communication unit 110 performs wireless communication with a base station apparatus accommodated in the mobile communication network according to an instruction of the main control unit 100. Using this wireless communication, the wireless communication unit 110 performs transmission and reception of various types of file data such as audio data and image data, e-mail data, or the like, or reception of Web data, streaming data, or the like.

The display and input unit 120 is a so-called touch panel that displays, for example, images (still and moving images) or character information to visually deliver information to the user, and detects a user operation with respect to the displayed information under the control of the main control unit 100. The display and input unit 120 includes the display panel 121 and the operation panel 122.

The display panel 121 uses a liquid crystal display (LCD), an organic electro-luminescence display (OELD), or the like as a display device. The operation panel 122 is a device that is placed so that an image displayed on a display surface of the display panel 121 is viewable, and detects coordinates of an operation using a user's finger or a stylus. If this device is operated by the user's finger or the stylus, a detection signal generated due to the operation is output to the main control unit 100. Then, the main control unit 100 detects an operation position (coordinates) on the display panel 121 based on the received detection signal.

The display panel 121 and the operation panel 122 of the smartphone 101 illustrated as an embodiment of an imaging device of the present invention are integrally formed to constitute the display and input unit 120 as illustrated in FIG. 18, but the operation panel 122 is arranged to completely cover the display panel 121. When this arrangement is adopted, the operation panel 122 may have a function of detecting a user operation in an area outside the display panel 121. In other words, the operation panel 122 may include a detection area for an overlapping portion that overlaps the display panel 121 (hereinafter referred to as a display area), and a detection area for an outer edge portion that does not overlap the display panel 121 other than the display area (hereinafter referred to as a non-display area).

Although a size of the display area may perfectly match a size of the display panel 121, it is not always necessary to match both of the sizes. Further, the operation panel 122 may include two sensibility areas including an outer edge portion and an inner portion other than the outer edge portion. Further, a width of the outer edge portion is designed appropriately according to, for example, a size of the casing 102. Further, a position detection scheme adopted in the operation panel 122 includes, for example, a matrix switching scheme, a resistance film scheme, a surface acoustic wave scheme, an infrared scheme, an electromagnetic induction scheme, and a capacitance scheme, and any of the schemes can also be adopted.

The call unit 130 includes the speaker 131 and the microphone 132. The call unit 130 converts voice of the user input via the microphone 132 into audio data which can be processed by the main control unit 100, and outputs the audio data to the main control unit 100. The call unit 130 decodes audio data received by the wireless communication unit 110 or the external input and output unit 160 and outputs the audio data from the speaker 131. Further, as illustrated in FIG. 18, for example, the speaker 131 can be mounted on the same surface as the surface on which the display and input unit 120 is provided, and the microphone 132 can be mounted on a side surface of the casing 102.

The operation unit 140 is a hardware key using a key switch or the like, and receives an instruction from the user. For example, as illustrated in FIG. 18, the operation unit 140 is a push button type of switch that is mounted on the side surface of the casing 102 of the smartphone 101, is turned on if the operation unit 140 is pressed by a finger or the like, and is turned off due to a restoring force of a spring or the like if the finger is taken away.

The storage unit 150 stores a control program or control data of the main control unit 100, application software, address data associated with, for example, a name or a telephone number of a communication partner, transmitted and received e-mail data, Web data downloaded by Web browsing, or downloaded content data, and temporarily stores streaming data or the like. Further, the storage unit 150 includes an internal storage unit 151 built into a smartphone, and a detachable external storage unit 152 with an external memory slot. Further, the internal storage unit 151 and the external storage unit 152 constituting the storage unit 150 are realized using a storage medium, such as a flash memory, hard disk, multimedia card micro, or card type memory (for example, MicroSD (registered trademark) memory), a random access memory (RAM), or a read only memory (ROM).

The external input and output unit 160 serves as an interface with all external devices connected to the smartphone 101, and is directly or indirectly connected to other external devices by, for example, communication (for example, Universal Serial Bus (USB) or IEEE1394) or a network (for example, the Internet, a wireless LAN, Bluetooth (registered trademark), a Radio Frequency Identification (RFID), infrared communication (Infrared Data Association: IrDA) (registered trademark), Ultra Wideband (UWB) (registered trademark), or ZigBee (registered trademark)).

Examples of the external device connected to the smartphone 101 include a wired/wireless headset, a wired/wireless external charger, a wired/wireless data port, a memory card connected via a card socket, a subscriber identity module (SIM)/user identity module (UIM) card, an external audio and video device connected via an audio and video input/output (I/O) terminal, a wirelessly connected external audio and video device, a wiredly/wirelessly connected smartphone, a wiredly/wirelessly connected personal computer, a wiredly/wirelessly connected PDA, and an earphone. The external input and output unit may deliver data received from such an external device to each component inside the smartphone 101 or may transfer internal data of the smartphone 101 to the external device.

The GPS reception unit 170 receives GPS signals transmitted from GPS satellites ST1 to STn, executes a positioning calculation process based on a plurality of received GPS signals, and detects a position consisting of latitude, longitude, and altitude of the smartphone 101 according to an instruction of the main control unit 100. In a case in which the GPS reception unit 170 can acquire position information from the wireless communication unit 110 or the external input and output unit 160 (for example, a wireless LAN), the GPS reception unit 170 can also detect the position using the position information.

The motion sensor unit 180 includes, for example, a triaxial acceleration sensor, and detects a physical movement of the smartphone 101 according to an instruction of the main control unit 100. By detecting the physical movement of the smartphone 101, a movement direction and an acceleration of the smartphone 101 are detected. A result of the detection is output to the main control unit 100.

The power supply unit 190 supplies power accumulated in a battery (not illustrated) to each unit of the smartphone 101 according to an instruction of the main control unit 100.

The main control unit 100 includes a microprocessor, operates according to a control program or control data stored in the storage unit 150, and generally controls of the respective units of the smartphone 101. Further, the main control unit 100 includes a mobile communication control function of controlling each unit of a communication system and an application processing function in order to perform voice communication and data communication through the wireless communication unit 110.

The application processing function is realized by the main control unit 100 operating according to application software stored in the storage unit 150. Examples of the application processing function include an infrared communication function of controlling the external input and output unit 160 and performing data communication with a facing device or an e-mail function of performing transmission and reception of an e-mail, a Web browsing function for browsing Web pages, and the like.

Further, the main control unit 100 includes an image processing function such as a function of displaying an image on the display and input unit 120 based on the received data or image data such as downloaded streaming data (data of a still image or a moving image). The image processing function refers to a function of the main control unit 100 decoding the image data, performing image processing on a result of the decoding, and displaying an image on the display and input unit 120.

Further, the main control unit 100 executes a display control for the display panel 121, and an operation detection control for detecting a user operation through the operation unit 140 and the operation panel 122.

Through execution of the display control, the main control unit 100 displays an icon for starting up application software or a software key such as or a scroll bar, or displays a window for creating an e-mail. The scroll bar refers to a software key for receiving an instruction to move a displayed portion of an image with respect to a large image that cannot fit into a display area of the display panel 121.

Further, through execution of the operation detection control, the main control unit 100 detects a user operation through the operation unit 140, receives an operation with respect to the icon or an input of a character string to an input field of the window through the operation panel 122, or receives a scroll request of a displayed image through the scroll bar.

Further, through the execution of the operation detection control, the main control unit 100 includes a touch panel control function of determining whether an operation position of the operation panel 122 is an overlapping portion (a display area) that overlaps the display panel 121 or an outer edge portion (a non-display area) that does not overlap the display panel 121, other than the overlapping portion, and controlling a sensibility area of the operation panel 122 or a display position of the software key.

Further, the main control unit 100 can also detect a gesture operation with respect to the operation panel 122 and execute a preset function according to the detected gesture operation. The gesture operation refers to an operation of drawing a locus with a finger or the like, simultaneously designating a plurality of positions, or drawing a locus for at least one of a plurality of positions through a combination thereof, rather than a conventional simple touch operation.

The camera unit 141 is a digital camera that performs electronic imaging using an imaging element such as a CMOS. Further, the camera unit 141 converts image data acquired by imaging into, for example, compressed image data such as JPEG, records the compressed image data in the storage unit 150, and outputs the compressed image data via the external input and output unit 160 or the wireless communication unit 110 under control of the main control unit 100. As illustrated in FIG. 18, in the smartphone 101, the camera unit 141 is mounted on the same surface as the display and input unit 120, but a mounting position of the camera unit 141 is not limited thereto. The camera unit 141 may be mounted on a rear surface of the display and input unit 120 or a plurality of the camera units 141 may be mounted. In a case in which a plurality of camera units 141 are mounted, the camera unit 141 provided for imaging is selected through switching to perform imaging or the plurality of camera units 141 may be simultaneously used to perform imaging.

Further, the camera unit 141 can be used for various functions of the smartphone 101. For example, it is possible to display the image acquired by the camera unit 141 on the display panel 121 or it is possible to use the image of the camera unit 141 as one operation input of the operation panel 122. Further, when the GPS reception unit 170 detects the position, it is also possible to detect the position by referring to the image from the camera unit 141. Further, it is possible to determine an optical axis direction of the camera unit 141 of the smartphone 101 without using a triaxial acceleration sensor or using the triaxial acceleration sensor together by referring to the image from the camera unit 141 or it is also possible to determine a current use environment. Of course, it is also possible to use an image from the camera unit 141 within the application software.

Further, position information acquired by a GPS reception unit 170, voice information (which may be converted into text information through voice-to-text conversion by the main control unit or the like) acquired by the microphone 132, posture information acquired by the motion sensor unit 180, or the like may be added to the image data of the still image or the moving image, and the resultant image data may be record in the storage unit 150 and output through the external input and output unit 160 or the wireless communication unit 110.

For example, the terminal system controller 28 and the display control unit 25 illustrated in FIG. 2 can be realized by the main control unit 100 illustrated in FIG. 19, and the terminal external input and output unit 23 (FIG. 2) can be realized by the wireless communication unit 110 and/or the external input and output unit 160 (FIG. 19). Further, the terminal input unit 20 (FIG. 2) can be realized by the operation panel 122 (display and input unit 120) (FIG. 19), and the display unit 27 (FIG. 2) can be realized by the display panel 121 (display and input unit 120) (FIG. 19).

EXPLANATION OF REFERENCES

1: search system, 10: server system, 11: client terminal, 12: network, 15: Web server, 16: database server, 17: image analysis server, 18: mail server, 20: terminal input unit, 21: terminal transmission unit, 22: terminal reception unit, 23: terminal external input and output unit, 25: display control unit, 27: display unit, 28: terminal system controller, 31: server transmission unit, 32: server reception unit, 33: server external input and output unit, 35: user attributes information acquisition unit, 36: user information database, 37: conversion table acquisition unit, 38: conversion table database, 39: physical amount acquisition unit, 41: image search unit, 42: image database, 43: image alignment unit, 45: image analysis unit, 48: server system controller, 50: user ID data input field, 51: password input field, 52: software keyboard, 60: physical amount data portion, 62: characteristics data portion, 64: coordinate system, 66: product image, 70: database controller, 72: image analysis controller, 80: sensibility space, 82: physical measurement space, 84: sensibility area, 86: physical amount area, 100: main control unit, 101: smartphone, 102: casing, 110: wireless communication unit, 120: display and input unit, 121: display panel, 122: operation panel, 130: call unit, 131: speaker, 132: microphone, 140: operation unit, 141: camera unit, 150: storage unit, 151: internal storage unit, 152: external storage unit, 160: external input and output unit, 170: GPS reception unit, 180: motion sensor unit, 190: power supply unit, T: conversion table, I: image data, M: metadata, D1: user identification data, D2: sensibility word data, D3: user attributes data, D4: physical amount data, D5: search result data, D6: display information data, D7: image information data

What is claimed is:

1. A search system comprising a client terminal, and a server system connected to the client terminal over a network, wherein the server system includes:
　a server reception unit that receives data transmitted from the client terminal over the network;
　a physical amount acquisition unit that acquires a physical amount of a product associated with sensibility word data received by the server reception unit from the client terminal over the network, wherein the physical amount comprises data indicating physical characteristics of the product, and wherein the sensibility word data comprises data inputted or selected by a user representing an impression that the user expects from a search for the product;
　an image search unit that acquires image data of the product associated with the physical amount of the product acquired by the physical amount acquisition unit;
　an image alignment unit that determines a display aspect of the image data of the product acquired by the image search unit, and generates display information data indicating the determined display aspect;
　a server transmission unit that transmits the image data of the product acquired by the image search unit and the display information data generated by the image alignment unit to the client terminal over the network;
　a user information database that stores user identification data and user attributes data in association with each other;
　a user attributes information acquisition unit that accesses the user information database, and acquires the user attributes data associated with the user identification data received from the client terminal over the network;
　a conversion table database that stores a plurality of conversion tables determined according to the user attributes data, the physical amount of the product and the sensibility word data being associated with each other in the plurality of conversion tables;
　a conversion table acquisition unit that accesses the conversion table database, and acquires at least one conversion table of the plurality of conversion tables determined according to the user attributes data acquired by the user attributes information acquisition unit; and
　an image database that stores the image data of the product and the physical amount of the product in association with each other, wherein the client terminal includes:
　a display unit;
　a terminal input unit that receives an instruction from a user and specifies the sensibility word data;
　a terminal transmission unit that transmits the sensibility word data specified by the terminal input unit to the server system over the network;
　a terminal reception unit that receives the image data of the product and the display information data transmitted from the server system over the network; and
　a display control unit that displays the image data of the product received by the terminal reception unit on the display unit according to the display information data received by the terminal reception unit, wherein:
the terminal input unit receives the instruction from the user and specifies the user identification data and the sensibility word data,
the terminal transmission unit transmits the user identification data and the sensibility word data specified by the terminal input unit to the server system over the network,
the physical amount acquisition unit acquires the physical amount of the product associated with the sensibility word data received by the server reception unit by referring to the at least one conversion table acquired by the conversion table acquisition unit,
the image search unit accesses the image database to acquire the image data of the product associated with the physical amount of the product acquired by the physical amount acquisition unit, and
at least a portion of the image data of the product acquired by the image search unit is displayed on the display unit using a coordinate system representing characteristics data of the product such that a relationship among the characteristics data of the product can intuitively be understood by the user, the characteristics data of the product being determined based at least in part on the physical characteristics of the product.

2. The search system according to claim 1, wherein:
the image alignment unit determines that the display aspect of the image data of the product acquired by the image search unit is an aspect in which the image data of the product is displayed according to characteristics data of the product, and
the display information data indicates a display aspect in which the image data of the product acquired by the image search unit is displayed according to characteristics data of the product.

3. The search system according to claim 1, wherein the display information data indicates a display aspect in which of the image data of the product is displayed on the coordinate system.

4. The search system according to claim 1, wherein the characteristics data of the product is determined based on characteristics of the product different from the sensibility word data that the terminal input unit specifies among the characteristics of the product.

5. The search system according to claim 1, wherein the characteristics data of the product is determined based on data of at least one of a price of the product, a size of the product, a color of the product, a pattern of the product, a texture of the product, and a shape of the product.

6. The search system according to claim 1, wherein the physical amount of the product is determined based on at least one of a color of the product, a pattern of the product, a texture of the product, or a shape of the product.

7. The search system according to claim 1, wherein the user attributes data is determined based on at least one of gender, age, race, nationality, religion, or sect of the user.

8. The search system according to claim 1, wherein:
the display control unit displays a plurality of sensibility words on the display unit, and
the terminal input unit receives the instruction from the user, specifies at least one of the plurality of sensibility words displayed on the display unit, and specifies the specified sensibility word as the sensibility word data.

9. The search system according to claim 1, wherein the image data of the product is acquired by imaging the product.

10. The search system according to claim 1, wherein metadata indicating the physical amount of the product is associated with the image data of the product, and
the image search unit acquires the image data of the product to which the metadata indicating the physical amount of the product acquired by the physical amount acquisition unit is associated, as image data of the product associated with the physical amount of the product acquired by the physical amount acquisition unit.

11. The search system according to claim 1, wherein the physical amount of the product associated with the image data of the product is acquired by analyzing the image data of the product.

12. The search system according to claim 1, wherein the server system further includes an image analysis unit that analyzes the image data of the product to acquire the physical amount of the product, the image analysis unit storing the acquired physical amount of the product in association with the image data of the product in the image database.

13. The search system according to claim 1,
wherein the user identification data and sensibility data from the terminal input unit is transmitted by the terminal transmission unit to the server system,
wherein the server reception unit of the server system transmits the user identification data to the user attribute information acquisition unit, which outputs the user attribute data to the conversion table acquisition unit, which transmits the conversion table,
wherein each conversion table includes the sensibility word data associated with the physical amount data based on user attribute data for each user, and
wherein the server reception unit of the server system transmits the sensibility word data to the physical acquisition unit, which outputs the physical amount data to the image search unit.

14. A control method for a search system comprising a client terminal, and a server system connected to the client terminal over a network, the control method comprising:
receiving, by a server reception unit in the server system, data transmitted from the client terminal over the network;
acquiring, by a physical amount acquisition unit in the server system, a physical amount of a product associated with sensibility word data received by the server reception unit from the client terminal over the network, wherein the physical amount comprises data indicating physical characteristics of the product, and wherein the sensibility word data comprises data inputted or selected by a user representing an impression that the user expects from a search for the product;
acquiring, by an image search unit in the server system, image data of the product associated with the physical amount of the product acquired by the physical amount acquisition unit;
determining, by an image alignment unit in the server system, a display aspect of the image data of the product acquired by the image search unit, and generating display information data indicating the determined display aspect;
transmitting, by a server transmission unit in the server system, the image data of the product acquired by the image search unit and the display information data generated by the image alignment unit to the client terminal over the network;
storing, by a user information database in the server system, user identification data and user attributes data in association with each other;
accessing, by a user attributes information acquisition unit in the server system, the user information database, and acquiring the user attributes data associated with the user identification data received from the client terminal over the network;
storing, by a conversion table database in the server system, a plurality of conversion tables determined according to the user attributes data, the physical amount of the product and the sensibility word data being associated with each other in the plurality of conversion tables;
accessing, by a conversion table acquisition unit in the server system, the conversion table database, and acquiring at least one conversion table of the plurality of conversion tables determined according to the user attributes data acquired by the user attributes information acquisition unit;

storing, by an image database in the server system, the image data of the product and the physical amount of the product in association with each other;

transmitting, by a terminal transmission unit in the client terminal to the server system over the network, the sensibility word data specified by a terminal input unit that receives an instruction from a user;

receiving, by a terminal reception unit in the client terminal, the image data of the product and the display information data transmitted from the server system over the network; and displaying, by a display control unit in the client terminal, the image data of the product received by the terminal reception unit on the display unit according to the display information data received by the terminal reception unit, wherein:

by the terminal input unit, the instruction from the user is received and the user identification data and the sensibility word data are specified, by the terminal transmission unit, the user identification data and the sensibility word data specified by the terminal input unit are transmitted to the server system over the network, by the physical amount acquisition unit, the physical amount of the product associated with the sensibility word data received by the server reception unit is acquired by referring to the at least one conversion table acquired by the conversion table acquisition unit, by the image search unit, the image database is accessed and the image data of the product associated with the physical amount of the product acquired by the physical amount acquisition unit is acquired, and at least a portion of the image data of the product acquired by the image search unit is displayed on the display unit using a coordinate system representing characteristics data of the product such that a relationship among the characteristics data of the product can intuitively be understood by the user, the characteristics data of the product being determined based at least in part on the physical characteristics of the product.

15. The control method according to claim 14, wherein the user identification data and sensibility data from the terminal input unit is transmitted by the terminal transmission unit to the server system, wherein the server reception unit of the server system transmits the user identification data to the user attribute information acquisition unit, which outputs the user attribute data to the conversion table acquisition unit, which transmits the conversion table, wherein each conversion table includes the sensibility word data associated with the physical amount data based on user attribute data for each user, and wherein the server reception unit of the server system transmits the sensibility word data to the physical acquisition unit, which outputs the physical amount data to the image search unit.

16. The control method according to claim 14, wherein the display information data indicates a display aspect in which the image data of the product is displayed on the coordinate system.

17. The control method according to claim 14, wherein the characteristics data of the product is determined based on characteristics of the product different from the sensibility word data that the terminal input unit specifies among the characteristics of the product.

18. The control method according to claim 14, wherein the characteristics data of the product is determined based on data of at least one of a price of the product, a size of the product, a color of the product, a pattern of the product, a texture of the product, and a shape of the product.

* * * * *